US012025191B2

(12) United States Patent
Takagi et al.

(10) Patent No.: US 12,025,191 B2
(45) Date of Patent: Jul. 2, 2024

(54) CLUTCH DEVICE

(71) Applicant: DENSO CORPORATION, Kariya (JP)

(72) Inventors: Akira Takagi, Kariya (JP); Takumi Sugiura, Kariya (JP); Masashi Nakagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/327,424

(22) Filed: Jun. 1, 2023

(65) Prior Publication Data
US 2023/0313847 A1 Oct. 5, 2023

Related U.S. Application Data

(63) Continuation of application No. PCT/JP2021/043873, filed on Nov. 30, 2021.

(30) Foreign Application Priority Data

Dec. 3, 2020 (JP) ................................. 2020-201318
Feb. 4, 2021 (JP) ................................. 2021-016878

(51) Int. Cl.
*F16D 23/12* (2006.01)
*F16D 28/00* (2006.01)
(Continued)

(52) U.S. Cl.
CPC ........... *F16D 28/00* (2013.01); *F16D 48/064* (2013.01); *H02K 7/108* (2013.01); *H02K 7/116* (2013.01);
(Continued)

(58) Field of Classification Search
CPC .............................................. F16D 2023/123
See application file for complete search history.

(56) References Cited

U.S. PATENT DOCUMENTS 7,083,033 B2 * 8/2006 Yamazaki ........... F16D 25/0638
192/93 A
2005/0167229 A1 * 8/2005 Tsukada .................. F16D 13/54
192/54.52
(Continued)

FOREIGN PATENT DOCUMENTS

CN 1963252 A * 5/2007 ............. F16D 23/12
JP 53092542 U 7/1978
(Continued)

OTHER PUBLICATIONS

U.S. Appl. No. 18/327,515 to Takumi Sugiura et al., filed Jun. 1, 2023 (88 pages).
(Continued)

*Primary Examiner* — Stacey A Fluhart
(74) *Attorney, Agent, or Firm* — Nixon & Vanderhye P.C.

(57) ABSTRACT

A first drive cam groove extends from a drive cam specific position to one side in a circumferential direction. A second drive cam groove extends from the drive cam specific position to the other side in the circumferential direction, and an inclination angle of a groove bottom with respect to one end surface of the drive cam main body is larger than that of the first drive cam groove. A first driven cam groove extends from a driven cam specific position to one side in a circumferential direction. A second driven cam groove extends from the driven cam specific position to the other side in the circumferential direction, and an inclination angle of a groove bottom with respect to one end surface of the driven cam main body is larger than that of the first driven cam groove.

5 Claims, 15 Drawing Sheets

(51) Int. Cl.
  *F16D 48/06*  (2006.01)
  *H02K 7/108*  (2006.01)
  *H02K 7/116*  (2006.01)
  *F16D 13/38*  (2006.01)
  *F16D 127/02* (2012.01)

(52) U.S. Cl.
  CPC .......... *F16D 13/38* (2013.01); *F16D 2127/02* (2013.01); *F16D 2300/14* (2013.01)

(56) References Cited

U.S. PATENT DOCUMENTS

| | | | |
|---|---|---|---|
| 2007/0144861 A1 | 6/2007 | Yamasaki et al. | |
| 2012/0053002 A1* | 3/2012 | Schmidt | F16D 28/00 475/231 |
| 2012/0247914 A1* | 10/2012 | Chambrion | F16F 15/12366 192/207 |
| 2015/0144453 A1* | 5/2015 | Larkin | B60K 17/35 192/84.7 |
| 2017/0314654 A1* | 11/2017 | Fuller | F16H 61/6649 |
| 2019/0390736 A1 | 12/2019 | Dai et al. | |

FOREIGN PATENT DOCUMENTS

| | | | |
|---|---|---|---|
| JP | 03066927 | A | 3/1991 |
| JP | 2015017635 | A | 1/2015 |
| JP | 2018189207 | A | 11/2018 |

OTHER PUBLICATIONS

U.S. Appl. No. 18/327,640 to Soichiro Hayashi et al., filed Jun. 1, 2023 (48 pages).
U.S. Appl. No. 18/327,381 to Tomonori Suzuki et al., filed Jun. 1, 2023 (39 pages).
U.S. Appl. No. 18/327,597 to Akita Takagi et al., filed Jun. 1, 2023 (54 pages).
U.S. Appl. No. 18/327,806 to Tomonori Suzuki et al., filed Jun. 1, 2023 (37 pages).
U.S. Appl. No. 18/327,501 to Akikazu Uchida et al., filed Jun. 1, 2023 (51 pages).
U.S. Appl. No. 18/327,333 to Motoki Ichihara et al., filed Jun. 1, 2023 (54 pages).

* cited by examiner

| INPUT AND OUTPUT PATTERN | | | INERTIA MOMENT | SPEED REDUCTION RATIO |
|---|---|---|---|---|
| INPUT | OUTPUT | FIXED | | |
| S | D | C | MEDIUM | MEDIUM |
| S | C | D | MEDIUM | MEDIUM |
| C | D | S | LARGE | × (ACCELERATED) |
| C | S | D | LARGE | × (ACCELERATED) |
| D | S | C | LARGE | × (ACCELERATED) |
| D | C | S | LARGE | SMALL |

| INPUT AND OUTPUT PATTERN | | | INERTIA MOMENT | SPEED REDUCTION RATIO |
|---|---|---|---|---|
| INPUT | OUTPUT | FIXED | | |
| A | D | C | SMALL | LARGE |
| A | C | D | SMALL | LARGE |
| C | D | A | LARGE | × (ACCELERATED) |
| C | A | D | LARGE | × (ACCELERATED) |
| D | A | C | LARGE | × (ACCELERATED) |
| D | C | A | LARGE | SMALL |

CLUTCH DEVICE

CROSS REFERENCE TO RELATED APPLICATION

The present application is a continuation application of International Patent Application No. PCT/JP2021/043873 filed on Nov. 30, 2021, which designated the U.S. and claims the benefit of priority from Japanese Patent Applications No. 2020-201318 filed on Dec. 3, 2020 and No. 2021-016878 filed on Feb. 4, 2021. The entire disclosures of all of the above applications are incorporated herein by reference.

TECHNICAL FIELD

The present disclosure relates to a clutch device.

BACKGROUND

Conventionally, a clutch device has been used to permit or block torque transmission.

SUMMARY

A clutch according to the present disclosure includes a housing, a prime mover, a speed reducer, a rolling body cam, a clutch, and a state changing unit.

BRIEF DESCRIPTION OF THE DRAWINGS

The above and other objects, features, and advantages of the present disclosure will become more apparent from the following detailed description with reference to the accompanying drawings. In the drawings.

DETAILED DESCRIPTION

Figure 1:
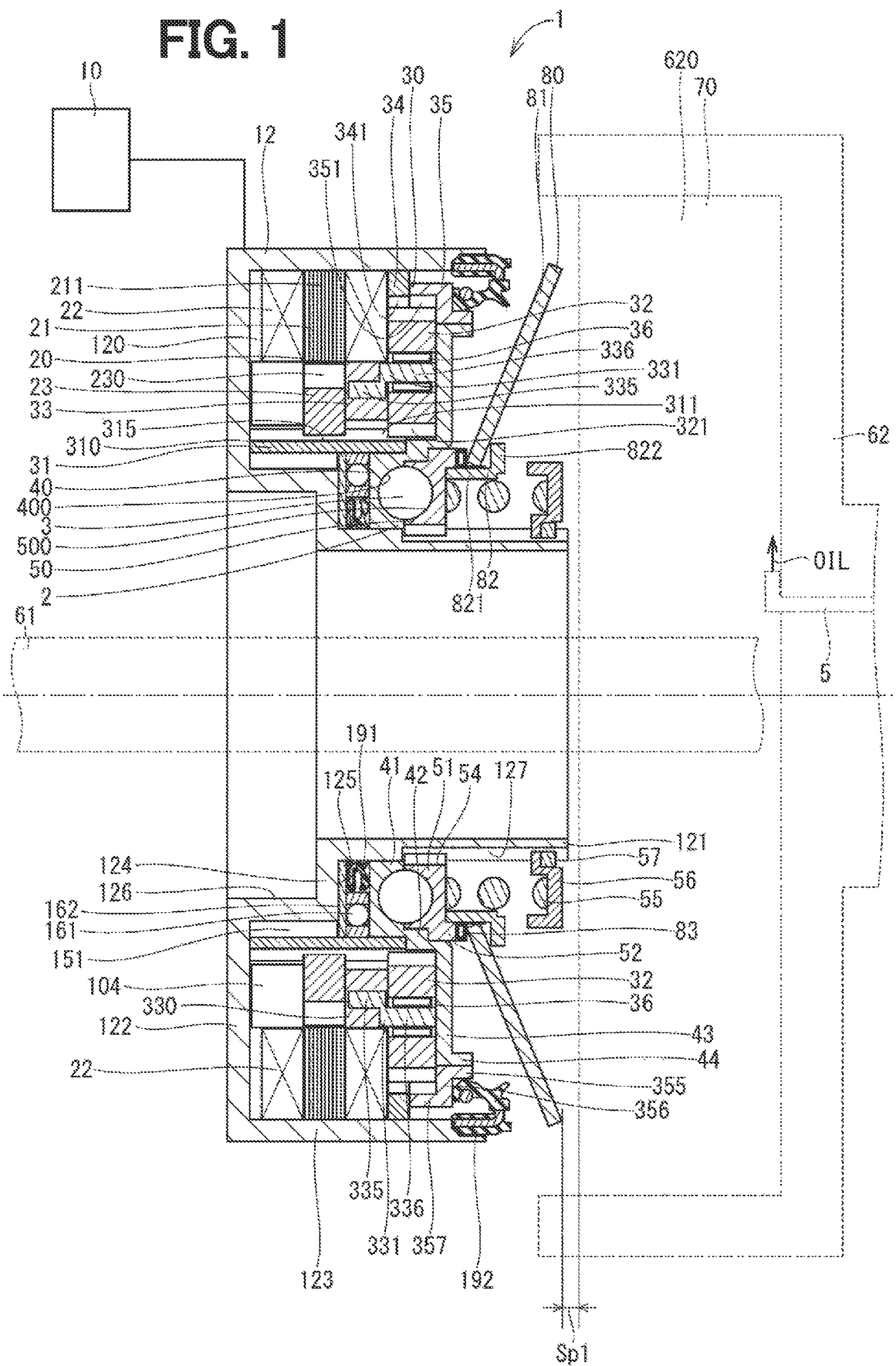
FIG. 1 is a cross-sectional view showing a clutch device according to a first embodiment.

Hereinafter, examples of the present disclosure will be described.

According to an example of the present disclosure, a clutch device permits or blocks torque transmission between a first transmission portion and a second transmission portion by changing a state of a clutch to an engaged state or a non-engaged state.

For example, in a clutch device, rotational motion of an electric motor is decelerated by a speed reducer and converted into translational motion by a rolling body cam, and a state of a clutch is changed by pressing the clutch.

In the clutch device, for example, a rolling body cam restores to an origin due to a load from a clutch side when a current to the electric motor is blocked or the like. When the rolling body cam restores to the origin, a rolling body and surrounding components receive a relatively large impact. In order to alleviate the impact and further limit the rolling body from slipping out from a groove, the rolling body cam includes an impact alleviating portion and a slipping prevention portion on a side opposite to the groove in which the rolling body rolls during normal operation.

The clutch device, for example, includes an urging member that urges the rolling body cam toward the origin. In addition, a contact angle between the rolling body and the slipping prevention portion is set to be larger than a contact angle between the rolling body and the impact alleviating portion.

In the clutch device, since a rotation angle of the rolling body cam is limited to a finite range and a rotation angle is also assigned to the slipping prevention portion, the impact alleviating portion may be shortened and the impact may not be sufficiently alleviated. In addition, when a rotation inertial force is greater than expected, a large impact load may be generated in the slipping prevention portion, and constituent components of the rolling body cam may be damaged.

An object of the present disclosure is to provide a clutch device that can limit damage of a rolling body cam during restoration to an origin.

A clutch according to an example of the present disclosure includes a housing, a prime mover, a speed reducer, a rolling body cam, a clutch, and a state changing unit. The prime mover is provided in the housing and configured to operate by energization and output a torque. The speed reducer configured to decelerate and output the torque of the prime mover.

The rolling body cam includes a drive cam that includes a drive cam main body and multiple drive cam grooves formed in one end surface of the drive cam main body and rotates relative to a housing when a torque output from a speed reducer is input, a driven cam that includes a driven cam main body and multiple driven cam grooves formed in one end surface of the driven cam main body and moves relative to the housing in an axial direction when the drive cam rotates relative to the housing, and a rolling body that is provided to roll between the drive cam grooves and the driven cam grooves.

The clutch is provided between a first transmission portion and a second transmission portion that are provided rotatably relative to the housing, and is configured to permit torque transmission between the first transmission portion and the second transmission portion when in an engaged state and to block the torque transmission between the first transmission portion and the second transmission portion when in a non-engaged state. A state changing unit receives a force in the axial direction from the driven cam and can change a state of the clutch to the engaged state or the non-engaged state according to a relative position in the axial direction of the driven cam with respect to the housing. A control unit can control energization to a prime mover and control an operation of the prime mover.

The drive cam groove includes a first drive cam groove and a second drive cam groove. The first drive cam groove extends from a drive cam specific position, which is a specific position in a circumferential direction of the drive cam main body, to one side in the circumferential direction of the drive cam main body, and is formed with a groove bottom inclined with respect to the one end surface of the drive cam main body such that a depth becomes shallower from the drive cam specific position toward the one side in the circumferential direction of the drive cam main body. The second drive cam groove extends from the drive cam specific position to the other side in the circumferential direction of the drive cam main body, is provided with a groove bottom inclined with respect to the one end surface of the drive cam main body such that a depth becomes shallower from the drive cam specific position toward the other side in the circumferential direction of the drive cam main body, and in which an inclination angle of the groove bottom with respect to the one end surface of the drive cam main body is larger than an inclination angle of the groove bottom of the first drive cam groove.

The driven cam groove includes a first driven cam groove and a second driven cam groove. The first driven cam groove extends from a driven cam specific position, which is a specific position in a circumferential direction of the driven cam main body, to one side in the circumferential direction of the driven cam main body, and is formed with a groove bottom inclined with respect to the one end surface of the driven cam main body such that a depth becomes shallower from the driven cam specific position toward the one side in the circumferential direction of the driven cam main body. The second driven cam groove extends from the driven cam specific position to the other side in the circumferential direction of the driven cam main body, is provided with a groove bottom inclined with respect to the one end surface of the driven cam main body such that a depth becomes shallower from the driven cam specific position toward the other side in the circumferential direction of the driven cam main body, and in which an inclination angle of the groove bottom with respect to the one end surface of the driven cam main body is larger than an inclination angle of the groove bottom of the first driven cam groove.

The control unit is configured to control the operation of the prime mover such that the rolling body rolls in the first drive cam groove and the first driven cam groove during normal operation. Here, the "during normal operation" means a time period during which the prime mover is energized, the rolling body cam is operated, and the state of the clutch is changed to the engaged state or the non-engaged state.

In the present disclosure, for example, during normal operation, when the rolling body is in the first drive cam groove and the first driven cam groove, and the driven cam is at a position away from an initial position (origin) by a predetermined distance toward the clutch, if the energization to the prime mover is blocked due to power supply failure, the driven cam restores to the initial position by an urging force from the clutch side. At this time, the rolling body rolls in the first drive cam groove and the first driven cam groove, passes through the origin, and runs onto the second drive cam groove and the second driven cam groove.

Here, the inclination angles of the second drive cam groove and the second driven cam groove are set to be larger than the inclination angles of the first drive cam groove and the first driven cam groove. Therefore, the rolling body that passes through the origin and runs onto the second drive cam groove and the second driven cam groove slows down, stops, rolls toward the origin, and restoration to the origin is completed. In this way, in the present disclosure, an impact on the rolling body cam during restoration to the origin can be effectively reduced. Therefore, damage of the rolling body cam during restoration to the origin can be reduced.

Hereinafter, clutch devices according to multiple embodiments will be described with reference to the drawings. In the multiple embodiments, substantially the same components are denoted by the same reference numerals, and description thereof is omitted.

First Embodiment

Figure 2:
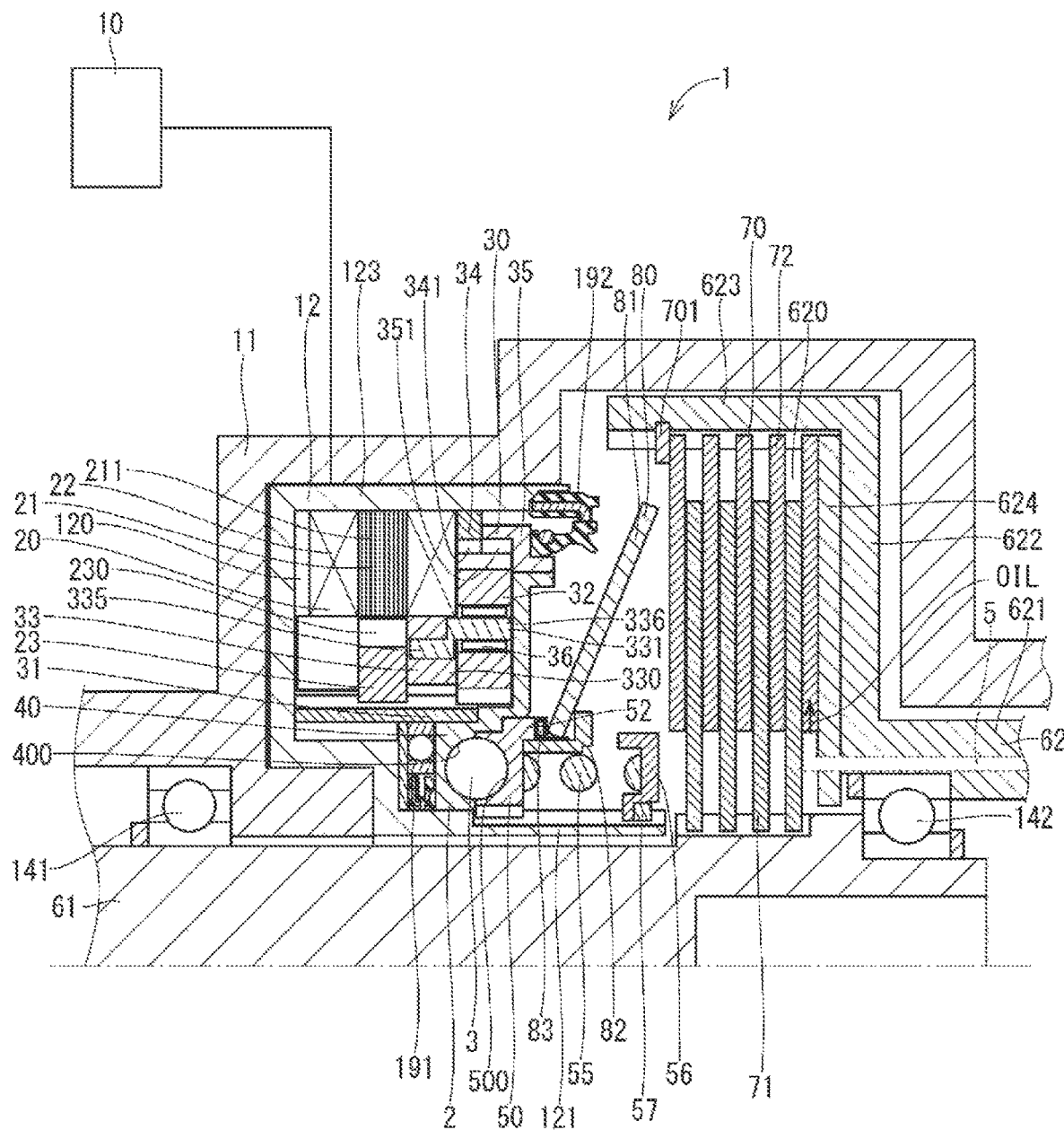
FIG. 2 is a cross-sectional view showing a part of the clutch device according to the first embodiment.

FIGS. 1 and 2 show a clutch device according to a first embodiment. A clutch device 1 is provided, for example, between an internal combustion engine and a transmission of a vehicle, and is used to permit or block torque transmission between the internal combustion engine and the transmission.

The clutch device 1 includes a housing 12, a motor 20 as a "prime mover", a speed reducer 30, a ball cam 2 as a "rotational translation unit" or a "rolling body cam", a clutch 70, a state changing unit 80, and an electronic control unit (hereinafter referred to as an "ECU") 10 as a "control unit".

The clutch device 1 includes an input shaft 61 as a "first transmission portion" and an output shaft 62 as a "second transmission portion".

The ECU 10 is a small computer including a CPU as a calculation means, a ROM, a RAM, and the like as a storage means, an I/O as an input and output means, and the like. The ECU 10 executes calculation according to a program stored in the ROM or the like based on information such as signals from various sensors provided in each part of the vehicle, and controls operations of various devices and machines of the vehicle. In this way, the ECU 10 executes a program stored in a non-transitory tangible storage medium. By executing the program, a method corresponding to the program is executed.

The ECU 10 can control an operation of the internal combustion engine and the like based on the information such as the signals from various sensors. The ECU 10 can also control an operation of the motor 20 to be described later.

The input shaft 61 is connected to, for example, a drive shaft (not shown) of the internal combustion engine, and is rotatable together with the drive shaft. That is, a torque is input to the input shaft 61 from the drive shaft.

The vehicle equipped with the internal combustion engine is provided with a fixed body 11 (see FIG. 2). The fixed body 11 is formed, for example, in a tubular shape, and is fixed to an engine compartment of the vehicle. A ball bearing 141 is provided between an inner peripheral wall of the fixed body 11 and an outer peripheral wall of the input shaft 61. Accordingly, the input shaft 61 is bearing-supported by the fixed body 11 via the ball bearing 141.

The housing 12 is provided between the inner peripheral wall of the fixed body 11 and the outer peripheral wall of the input shaft 61. The housing 12 includes a housing inner cylinder portion 121, a housing plate portion 122, a housing outer cylinder portion 123, a housing small plate portion 124, a housing step surface 125, a housing small inner cylinder portion 126, a housing-side spline groove portion 127, and the like.

The housing inner cylinder portion 121 is formed in a substantially cylindrical shape. The housing small plate portion 124 is formed in an annular plate shape to extend to a radially outer side from an end portion of the housing inner cylinder portion 121. The housing small inner cylinder portion 126 is formed in a substantially cylindrical shape to extend from an outer edge portion of the housing small plate portion 124 to a side opposite to the housing inner cylinder portion 121. The housing plate portion 122 is formed in an annular plate shape to extend to the radially outer side from an end portion of the housing small inner cylinder portion 126 on a side opposite to the housing small plate portion 124. The housing outer cylinder portion 123 is formed in a substantially cylindrical shape to extend from an outer edge portion of the housing plate portion 122 to the same side as the housing small inner cylinder portion 126 and the housing inner cylinder portion 121. Here, the housing inner cylinder portion 121, the housing small plate portion 124, the housing small inner cylinder portion 126, the housing plate portion 122, and the housing outer cylinder portion 123 are integrally formed of, for example, metal.

As described above, the housing 12 is formed in a hollow and flat shape as a whole.

The housing step surface 125 is formed in an annular planar shape on a surface of the housing small plate portion 124 on a side opposite to the housing small inner cylinder portion 126. The housing-side spline groove portion 127 is formed in an outer peripheral wall of the housing inner cylinder portion 121 to extend in an axial direction of the housing inner cylinder portion 121. Multiple housing-side spline groove portions 127 are formed in a circumferential direction of the housing inner cylinder portion 121.

The housing 12 is fixed to the fixed body 11 such that a part of an outer wall is in contact with a part of a wall surface of the fixed body 11 (see FIG. 2). The housing 12 is fixed to the fixed body 11 by bolts (not shown) or the like. Here, the housing 12 is provided coaxially with the fixed body 11 and the input shaft 61. In addition, a substantially cylindrical space is formed between an inner peripheral wall of the housing inner cylinder portion 121 and the outer peripheral wall of the input shaft 61.

The housing 12 has an accommodation space 120. The accommodation space 120 is defined by the housing inner cylinder portion 121, the housing small plate portion 124, the housing small inner cylinder portion 126, the housing plate portion 122, and the housing outer cylinder portion 123.

The motor 20 is accommodated in the accommodation space 120. The motor 20 includes a stator 21, a rotor 23, and the like. The stator 21 includes a stator core 211 and a coil 22. The stator core 211 is formed of, for example, a laminated steel plate in a substantially annular shape, and is fixed to an inside of the housing outer cylinder portion 123. The coil 22 is provided on each of multiple salient poles of the stator core 211.

The motor 20 includes a magnet 230 as a "permanent magnet". The rotor 23 is formed of, for example, iron-based metal in a substantially annular shape. More specifically, the rotor 23 is formed of, for example, pure iron having a relatively high magnetic property.

The magnet 230 is provided on an outer peripheral wall of the rotor 23. Multiple magnets 230 are provided at equal intervals in a circumferential direction of the rotor 23 such that magnetic poles are alternately arranged.

The clutch device 1 includes a bearing 151. The bearing 151 is provided on an outer peripheral wall of the housing small inner cylinder portion 126. A sun gear 31, which will be described later, is provided on the radially outer side of the bearing 151. The rotor 23 is provided on the radially outer side of the sun gear 31 so as not to be rotatable relative to the sun gear 31. The bearing 151 is provided in the accommodation space 120 and rotatably supports the sun gear 31, the rotor 23, and the magnets 230.

Figure 6:
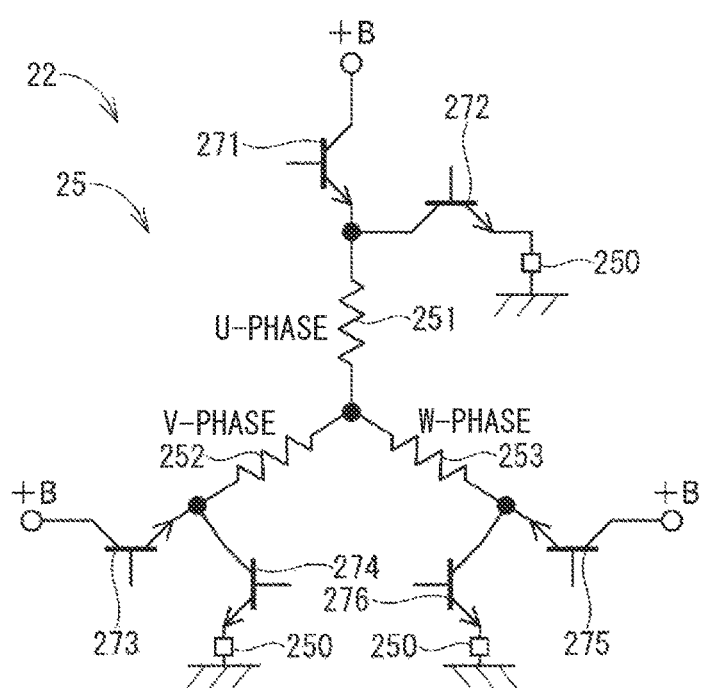
FIG. 6 is a schematic diagram showing a coil of a prime mover of the clutch device according to the first embodiment.

Here, the coil 22 includes a winding set 25 (see FIG. 6). The winding set 25 includes a U-phase winding 251, a V-phase winding 252, and a W-phase winding 253. The U-phase winding 251, the V-phase winding 252, and the W-phase winding 253 are each wound around the stator core 211, and electrically connected at one end thereof.

The ECU 10 includes switching elements 271 to 276 and a voltage detection unit 250.

In the switching element 271, one end is connected to a positive electrode of a battery (not shown), and the other end is connected to one end of the switching element 272. The other end of the switching element 272 is connected to a ground. In the switching element 273, one end is connected to the positive electrode of the battery (not shown), and the other end is connected to one end of the switching element 274. The other end of the switching element 274 is connected to the ground. In the switching element 275, one end is connected to the positive electrode of the battery (not shown), and the other end is connected to one end of the switching element 276. The other end of the switching element 276 is connected to the ground.

The other end of the U-phase winding 251 is connected to a connection point between the switching element 271 and the switching element 272. The other end of the V-phase winding 252 is connected to a connection point between the switching element 273 and the switching element 274. The other end of the W-phase winding 253 is connected to a connection point between the switching element 275 and the switching element 276.

The voltage detection unit 250 is provided between the switching elements 272, 274, and 276 and the ground, and can detect a potential difference at relevant locations.

The ECU 10 can control the operation of the motor 20 by controlling electric power supplied to the coil 22. When the electric power is supplied to the coil 22, a rotating magnetic field is generated in the stator core 211, and the rotor 23 rotates. Accordingly, the torque is output from the rotor 23. In this way, the motor 20 includes the stator 21 and the rotor 23 provided rotatably relative to the stator 21, and can output the torque from the rotor 23 by being supplied with electric power.

More specifically, the ECU 10 can control the operation of the motor 20 such that the rotor 23 rotates forward or reversely by controlling electric power supplied from the battery to the winding set 25 by controlling switching operations of the switching elements 271 to 276.

In this way, in the present embodiment, the motor 20 includes one winding set (25), that is, one system of winding set, and normally outputs the torque by energization to the winding set 25. At the time of a power supply failure such as disconnection of the winding set 25, the energization of the winding set 25 is blocked, and the operation of the motor 20 is stopped.

The ECU 10 can detect a current value flowing through the winding set 25 based on a voltage detected by the voltage detection unit 250. Accordingly, the ECU 10 can detect the disconnection of the winding set 25.

Here, the rotor 23 is provided on a radially inner side of the stator core 211 of the stator 21 to be rotatable relative to the stator 21. The motor 20 is an inner rotor-type brushless DC motor.

In the present embodiment, the clutch device 1 includes a rotation angle sensor 104. The rotation angle sensor 104 is provided in the accommodation space 120.

The rotation angle sensor 104 detects a magnetic flux generated from a sensor magnet rotating integrally with the rotor 23, and outputs a signal corresponding to the detected magnetic flux to the ECU 10. Accordingly, the ECU 10 can detect a rotation angle, a rotation speed, and the like of the rotor 23 based on the signal from the rotation angle sensor 104. In addition, the ECU 10 can calculate, based on the rotation angle, the rotation speed, and the like of the rotor 23, a relative rotation angle of a drive cam 40 with respect to the housing 12 and a driven cam 50 to be described later, relative positions of the driven cam 50 and the state changing unit 80 in the axial direction with respect to the housing 12 and the drive cam 40, and the like.

The speed reducer 30 is accommodated in the accommodation space 120. The speed reducer 30 includes the sun gear 31, a planetary gear 32, a carrier 33, a first ring gear 34, a second ring gear 35, and the like.

The sun gear 31 is provided coaxially with and integrally rotatably with the rotor 23. That is, the rotor 23 and the sun gear 31 are formed separately, and are coaxially arranged to be integrally rotatable.

More specifically, the sun gear 31 includes a sun gear main body 310, a sun gear tooth portion 311 as a "tooth portion" and "external teeth", and a gear-side spline groove portion 315. The sun gear main body 310 is formed of, for example, metal in a substantially cylindrical shape. The gear-side spline groove portion 315 is formed to extend in the axial direction on an outer peripheral wall of the sun gear main body 310 on one end portion side. Multiple gear-side spline groove portions 315 are formed in a circumferential direction of the sun gear main body 310. The one end portion side of the sun gear main body 310 is bearing-supported by the bearing 151.

Spline groove portions corresponding to the gear-side spline groove portions 315 are formed in an inner peripheral wall of the rotor 23. The rotor 23 is located on the radially outer side of the sun gear 31, and the spline groove portions are provided to be spline-coupled to the gear-side spline groove portions 315. Accordingly, the rotor 23 is not rotatable relative to and is movable in the axial direction relative to the sun gear 31.

The sun gear tooth portion 311 is formed on an outer peripheral wall of the sun gear 31 on the other end portion side. The torque of the motor 20 is input to the sun gear 31 that rotates integrally with the rotor 23. Here, the sun gear 31 corresponds to an "input unit" of the speed reducer 30. In the present embodiment, the sun gear 31 is formed of, for example, a steel material.

Multiple planetary gears 32 are provided in a circumferential direction of the sun gear 31, and can revolve in the circumferential direction of the sun gear 31 while meshing with the sun gear 31 and rotating on its axis. More specifically, the planetary gears 32 each are formed of, for example, metal in a substantially cylindrical shape, and four planetary gears 32 are provided at equal intervals in the circumferential direction of the sun gear 31 on the radially outer side of the sun gear 31. Each planetary gear 32 includes a planetary gear tooth portion 321 as a "tooth portion" and "external tooth". The planetary gear tooth portion 321 is formed on an outer peripheral wall of the planetary gear 32 to mesh with the sun gear tooth portion 311.

The carrier 33 rotatably supports the planetary gears 32 and is rotatable relative to the sun gear 31. More specifically, the carrier 33 is provided on the radially outer side of the sun gear 31. The carrier 33 is rotatable relative to the rotor 23 and the sun gear 31.

The carrier 33 includes a carrier main body 330 and a pin 331. The carrier main body 330 is formed of, for example, metal in a substantially annular shape. The carrier main body 330 is located between the sun gear 31 and the coil 22 in the radial direction, and is located between the rotor 23 and the magnet 230 and the planetary gear 32 in the axial direction. The planetary gear 32 is located on a side opposite to the housing plate portion 122 with respect to the carrier main body 330 and the coil 22.

The pin 331 includes a connection portion 335 and a support portion 336. The connection portion 335 and the support portion 336 are each formed of, for example, metal in a columnar shape. The connection portion 335 and the support portion 336 are integrally formed such that their respective axes are shifted from each other and are parallel to each other. Therefore, the connection portion 335 and the support portion 336 have a crank-like cross-sectional shape along a virtual plane including their respective axes (see FIG. 1).

The pin 331 is fixed to the carrier main body 330 such that the connection portion 335, which is a portion on one end portion side, is connected to the carrier main body 330. Here, the support portion 336 is provided such that the axis of the support portion 336 is located on the radially outer side of the carrier main body 330 with respect to the axis of the connection portion 335 on a side of the carrier main body 330 opposite to the rotor 23 and the magnet 230 (see FIG. 1). A total of four pins 331 are provided corresponding to the number of planetary gears 32.

The speed reducer 30 includes a planetary gear bearing 36. The planetary gear bearing 36 is, for example, a needle bearing, and is provided between an outer peripheral wall of the support portion 336 of the pin 331 and an inner peripheral wall of the planetary gear 32. Accordingly, the planetary gear 32 is rotatably supported by the support portion 336 of the pin 331 via the planetary gear bearing 36.

The first ring gear 34 includes a first ring gear tooth portion 341 that is a tooth portion that can mesh with the planetary gear 32, and is fixed to the housing 12. More specifically, the first ring gear 34 is formed of, for example, metal in a substantially annular shape. The first ring gear 34 is fixed to the housing 12 such that an outer edge portion is fitted to an inner peripheral wall of the housing outer cylinder portion 123 on a side opposite to the housing plate portion 122 with respect to the coil 22. Therefore, the first ring gear 34 is not rotatable relative to the housing 12.

Here, the first ring gear 34 is provided coaxially with the housing 12, the rotor 23, and the sun gear 31. The first ring gear tooth portion 341 as a "tooth portion" and "internal teeth" is formed in an inner edge portion of the first ring gear 34 to be able to mesh with one end portion side in the axial direction of the planetary gear tooth portion 321 of the planetary gear 32.

The second ring gear 35 includes a second ring gear tooth portion 351 that is a tooth portion that can mesh with the planetary gear 32 and has a different number of teeth from the first ring gear tooth portion 341, and is provided rotatably integrally with the drive cam 40 to be described later. More specifically, the second ring gear 35 is formed of, for example, metal in a substantially annular shape. The second ring gear 35 includes a gear inner cylinder portion 355, a gear plate portion 356, and a gear outer cylinder portion 357. The gear inner cylinder portion 355 is formed in a substantially cylindrical shape. The gear plate portion 356 is formed in an annular plate shape to extend to the radially outer side from one end of the gear inner cylinder portion 355. The gear outer cylinder portion 357 is formed in a substantially cylindrical shape to extend from an outer edge portion of the gear plate portion 356 to a side opposite to the gear inner cylinder portion 355.

Here, the second ring gear 35 is provided coaxially with the housing 12, the rotor 23, and the sun gear 31. The second ring gear tooth portion 351 as a "tooth portion" and "internal teeth" is formed on an inner peripheral wall of the gear outer cylinder portion 357 to be able to mesh with the other end portion side in the axial direction of the planetary gear tooth portion 321 of the planetary gear 32. In the present embodiment, the number of teeth of the second ring gear tooth portion 351 is larger than the number of teeth of the first ring gear tooth portion 341. More specifically, the number of teeth of the second ring gear tooth portion 351 is larger than the number of teeth of the first ring gear tooth portion 341 by a number obtained by multiplying 4, which is the number of planetary gears 32, by an integer.

Since the planetary gear 32 is required to normally mesh with the first ring gear 34 and the second ring gear 35 having two different specifications at the same portion without interference, the planetary gear 32 is designed such that one or both of the first ring gear 34 and the second ring gear 35 are dislocated to keep a center distance of each gear pair constant.

With the above configuration, when the rotor 23 of the motor 20 rotates, the sun gear 31 rotates, and the planetary gear tooth portion 321 of the planetary gear 32 revolves in the circumferential direction of the sun gear 31 while meshing with the sun gear tooth portion 311, the first ring gear tooth portion 341, and the second ring gear tooth portion 351 and rotating on its axis. Here, since the number of teeth of the second ring gear tooth portion 351 is larger than the number of teeth of the first ring gear tooth portion 341, the second ring gear 35 rotates relative to the first ring gear 34. Therefore, between the first ring gear 34 and the second ring gear 35, a minute differential rotation corresponding to a difference in the number of teeth between the first ring gear tooth portion 341 and the second ring gear tooth portion 351 is output as a rotation of the second ring gear 35. Accordingly, the torque from the motor 20 is decelerated by the speed reducer 30 and output from the second ring gear 35. In this way, the speed reducer 30 can decelerate and output the torque of the motor 20. In the present embodiment, the speed reducer 30 constitutes a 3k-type strange planetary gear speed reducer.

The second ring gear 35 is formed separately from the drive cam 40 to be described later, and is provided rotatably integrally with the drive cam 40. The second ring gear 35 decelerates the torque from the motor 20 and outputs the torque to the drive cam 40. Here, the second ring gear 35 corresponds to an "output unit" of the speed reducer 30.

The ball cam 2 includes the drive cam 40 as a "rotation portion", the driven cam 50 as a "translation portion", and balls 3 as a "rolling body".

The drive cam 40 includes a drive cam main body 41, a drive cam inner cylinder portion 42, a drive cam plate portion 43, a drive cam outer cylinder portion 44, a drive cam groove 400, and the like. The drive cam main body 41 is formed in a substantially annular plate shape. The drive cam inner cylinder portion 42 is formed in a substantially cylindrical shape to extend in the axial direction from an outer edge portion of the drive cam main body 41. The drive cam plate portion 43 is formed in a substantially annular plate shape to extend to the radially outer side from an end portion of the drive cam inner cylinder portion 42 on a side opposite to the drive cam main body 41. The drive cam outer cylinder portion 44 is formed in a substantially cylindrical shape to extend from an outer edge portion of the drive cam plate portion 43 to a side opposite to the drive cam inner cylinder portion 42. Here, the drive cam main body 41, the drive cam inner cylinder portion 42, the drive cam plate portion 43, and the drive cam outer cylinder portion 44 are integrally formed of, for example, metal.

Figure 7:
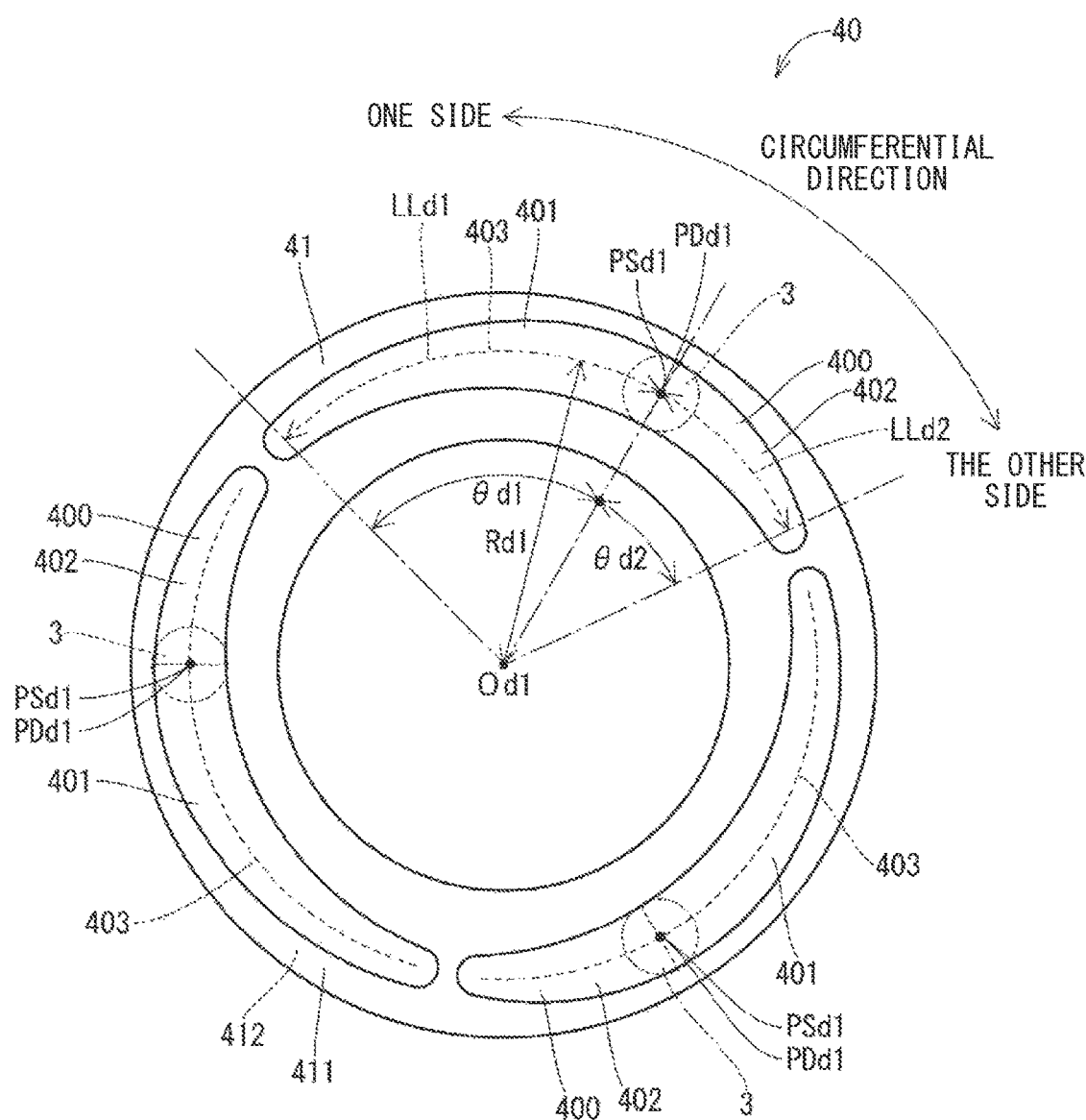
FIG. 7 is a diagram showing a drive cam main body of the clutch device according to the first embodiment.

The drive cam groove 400 is formed to be recessed from one end surface 411, which is a surface of the drive cam main body 41 on a drive cam inner cylinder portion 42 side, toward the other end surface 412 (see FIG. 7). The drive cam groove 400 is formed such that a depth from the one end surface 411 changes in a circumferential direction of the drive cam main body 41. For example, three drive cam grooves 400 are formed at equal intervals in the circumferential direction of the drive cam main body 41. A more detailed configuration of the drive cam groove 400 will be described later.

The drive cam 40 is provided between the housing inner cylinder portion 121 and the housing outer cylinder portion 123 such that the drive cam main body 41 is located between the outer peripheral wall of the housing inner cylinder portion 121 and an inner peripheral wall of the sun gear 31, and the drive cam plate portion 43 is located on a side opposite to the carrier main body 330 with respect to the planetary gear 32. The drive cam 40 is rotatable relative to the housing 12.

The second ring gear 35 is provided integrally with the drive cam 40 such that an inner peripheral wall of the gear inner cylinder portion 355 is fitted to an outer peripheral wall of the drive cam outer cylinder portion 44. The second ring gear 35 is not rotatable relative to the drive cam 40. That is, the second ring gear 35 is provided rotatably integrally with the drive cam 40 as a "rotation portion". Therefore, when the torque from the motor 20 is decelerated by the speed reducer 30 and output from the second ring gear 35, the drive cam 40 rotates relative to the housing 12. That is, when the torque output from the speed reducer 30 is input to the drive cam 40, the drive cam 40 rotates relative to the housing 12.

The driven cam 50 includes a driven cam main body 51, a driven cam cylinder portion 52, a cam-side spline groove portion 54, a driven cam groove 500, and the like. The driven cam main body 51 is formed in a substantially annular plate shape. The driven cam cylinder portion 52 is formed in a substantially cylindrical shape to extend in the axial direction from an outer edge portion of the driven cam main body 51. Here, the driven cam main body 51 and the driven cam cylinder portion 52 are integrally formed of, for example, metal.

The cam-side spline groove portion 54 is formed to extend in the axial direction in an inner peripheral wall of the driven cam main body 51. Multiple cam-side spline groove portions 54 are formed in a circumferential direction of the driven cam main body 51.

The driven cam 50 is provided such that the driven cam main body 51 is located on a side opposite to the housing step surface 125 with respect to the drive cam main body 41 and the radially inner side of the drive cam inner cylinder portion 42 and the drive cam plate portion 43, and the cam-side spline groove portions 54 are spline-coupled to the housing-side spline groove portions 127. Accordingly, the driven cam 50 is not rotatable relative to the housing 12 and is movable relative to the housing 12 in the axial direction.

Figure 8:
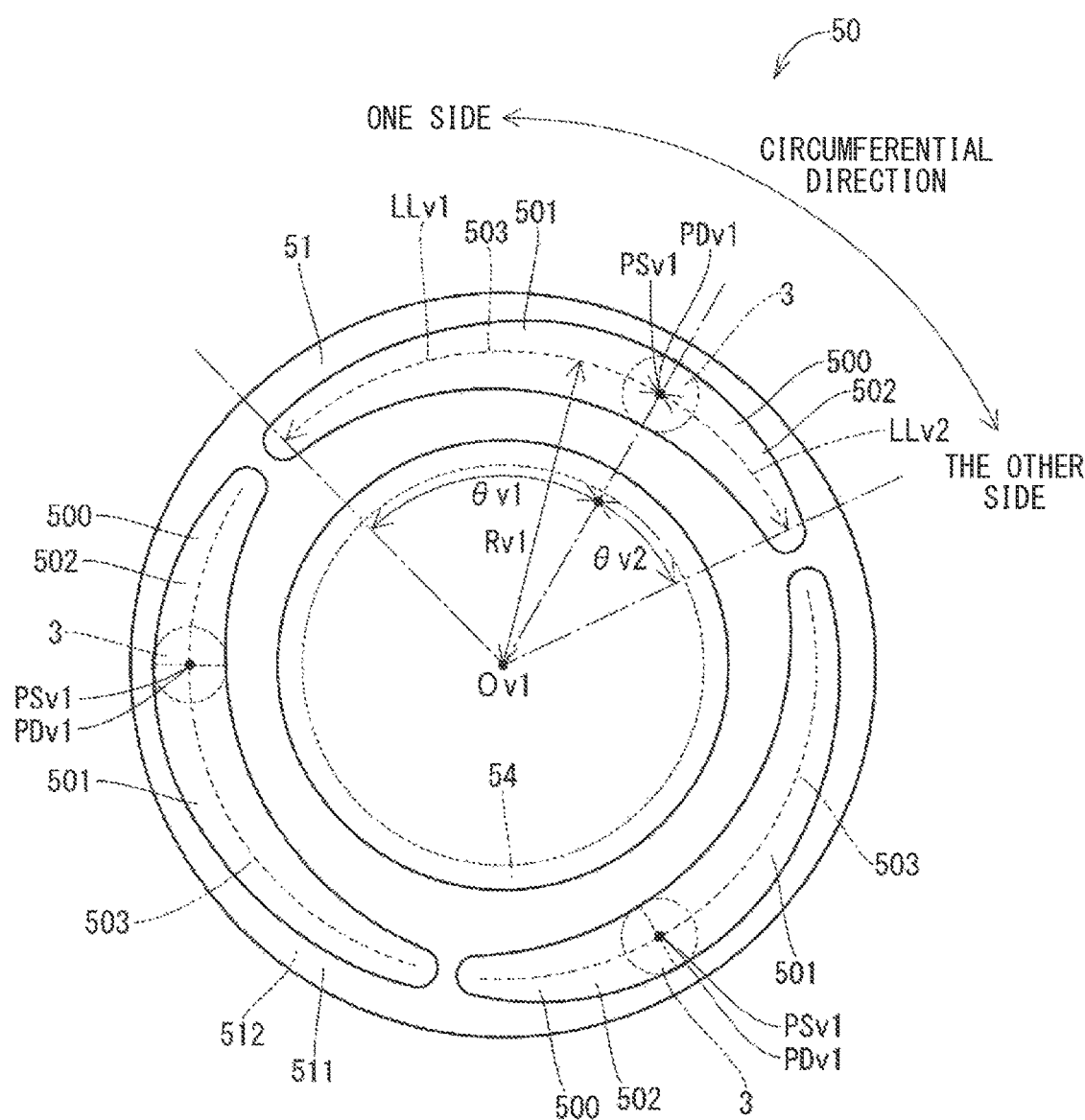
FIG. 8 is a diagram illustrating a driven cam main body of the clutch device according to the first embodiment.

The driven cam groove 500 is formed to be recessed from one end surface 511, which is a surface of the driven cam main body 51 on a drive cam main body 41 side, toward the other end surface 512 (see FIG. 8). The driven cam groove 500 is formed such that a depth from the one end surface 511 changes in the circumferential direction of the driven cam main body 51. For example, three driven cam grooves 500 are formed at equal intervals in the circumferential direction of the driven cam main body 51. A more detailed configuration of the driven cam groove 500 will be described later.

The drive cam groove 400 and the driven cam groove 500 are each formed to have the same shape when viewed from a surface side of the drive cam main body 41 on a driven cam main body 51 side or from a surface side of the driven cam main body 51 on the drive cam main body 41 side.

The balls 3 are formed of, for example, metal in a spherical shape. The balls 3 are provided to be able to roll between three drive cam grooves 400 and three driven cam grooves 500, respectively. That is, three balls 3 are provided in total.

In this way, the drive cam 40, the driven cam 50, and the balls 3 constitute the ball cam 2 as a "rolling body cam". When the drive cam 40 rotates relative to the housing 12 and the driven cam 50, the balls 3 roll along the respective groove bottoms in the drive cam grooves 400 and the driven cam grooves 500.

As shown in FIG. 1, the balls 3 are provided on the radially inner side of the first ring gear 34 and the second ring gear 35. More specifically, most of the balls 3 are provided within a range in the axial direction of the first ring gear 34 and the second ring gear 35.

As described above, the drive cam grooves 400 and the driven cam grooves 500 are formed such that the depth changes in the circumferential direction of the drive cam 40 or the driven cam 50. Therefore, when the drive cam 40 rotates relative to the housing 12 and the driven cam 50 due to the torque output from the speed reducer 30, the balls 3 roll in the drive cam grooves 400 and the driven cam grooves 500, and the driven cam 50 moves relative to the drive cam 40 and the housing 12 in the axial direction, that is, strokes.

In this way, the driven cam 50 includes multiple driven cam grooves 500 formed on the one end surface 511 to sandwich the balls 3 between the driven cam grooves 500 and the drive cam grooves 400, and constitutes the ball cam 2 together with the drive cam 40 and the balls 3. When the drive cam 40 rotates relative to the housing 12, the driven cam 50 moves relative to the drive cam 40 and the housing 12 in the axial direction. Here, since the cam-side spline groove portions 54 are spline-coupled to the housing-side spline groove portions 127, the driven cam 50 does not rotate relative to the housing 12. In addition, the drive cam 40 rotates relative to the housing 12, but does not move relative to the housing 12 in the axial direction.

In the present embodiment, the clutch device 1 includes a return spring 55 as an "urging member", a return spring retainer 56, and a C ring 57. The return spring 55 is, for example, a coil spring, and is provided on the radially outer side of an end portion of the housing inner cylinder portion 121 on a side opposite to the housing small plate portion 124 on a side of the driven cam main body 51 opposite to the drive cam main body 41. One end of the return spring 55 is in contact with a surface of the driven cam main body 51 on a side opposite to the drive cam main body 41.

The return spring retainer 56 is formed of, for example, metal in a substantially annular shape, and is in contact with the other end of the return spring 55 on the radially outer side of the housing inner cylinder portion 121. The C ring 57 is fixed to the outer peripheral wall of the housing inner cylinder portion 121 to lock a surface of the inner edge portion of the return spring retainer 56 on a side opposite to the driven cam main body 51.

The return spring 55 has a force extending in the axial direction. Therefore, the driven cam 50 is urged to the drive cam main body 41 side by the return spring 55 in a state where the ball 3 is sandwiched between the driven cam 50 and the drive cam 40.

The output shaft 62 includes a shaft portion 621, a plate portion 622, a cylinder portion 623, and a friction plate 624 (see FIG. 2). The shaft portion 621 is formed in a substantially cylindrical shape. The plate portion 622 is formed integrally with the shaft portion 621 to extend in an annular plate shape from one end of the shaft portion 621 to the radially outer side. The cylinder portion 623 is formed integrally with the plate portion 622 to extend in a substantially cylindrical shape from an outer edge portion of the plate portion 622 to a side opposite to the shaft portion 621. The friction plate 624 is formed in a substantially annular plate shape, and is provided on an end surface of the plate portion 622 on a cylinder portion 623 side. Here, the friction plate 624 is not rotatable relative to the plate portion 622. A clutch space 620 is formed in an inside of the cylinder portion 623.

An end portion of the input shaft 61 passes through an inside of the housing inner cylinder portion 121 and is located on a side opposite to the drive cam 40 with respect to the driven cam 50. The output shaft 62 is provided coaxially with the input shaft 61 on the side opposite to the drive cam 40 with respect to the driven cam 50. A ball bearing 142 is provided between an inner peripheral wall of the shaft portion 621 and an outer peripheral wall of the end portion of the input shaft 61. Accordingly, the output shaft 62 is bearing-supported by the input shaft 61 via the ball bearing 142. The input shaft 61 and the output shaft 62 are rotatable relative to the housing 12.

The clutch 70 is provided between the input shaft 61 and the output shaft 62 in the clutch space 620. The clutch 70 includes inner friction plates 71, outer friction plates 72, and a locking portion 701. Multiple inner friction plates 71 are each formed in a substantially annular plate shape, and are aligned in the axial direction between the input shaft 61 and the cylinder portion 623 of the output shaft 62. The inner friction plate 71 is provided such that an inner edge portion is spline-coupled to the outer peripheral wall of the input shaft 61. Therefore, the inner friction plates 71 are not rotatable relative to the input shaft 61 and are movable relative to the input shaft 61 in the axial direction.

Multiple outer friction plates 72 are each formed in a substantially annular plate shape, and are aligned in the axial direction between the input shaft 61 and the cylinder portion 623 of the output shaft 62. Here, the inner friction plates 71 and the outer friction plates 72 are alternately arranged in the axial direction of the input shaft 61. An outer edge portion of the outer friction plate 72 is spline-coupled to an inner peripheral wall of the cylinder portion 623 of the output shaft 62. Therefore, the outer friction plate 72 is not rotatable relative to the output shaft 62 and is movable relative to the output shaft 62 in the axial direction. Among the multiple outer friction plates 72, the outer friction plate 72 located closest to a friction plate 624 side can come into contact with the friction plate 624.

The locking portion 701 is formed in a substantially annular shape, and is provided such that an outer edge portion is fitted to the inner peripheral wall of the cylinder portion 623 of the output shaft 62. The locking portion 701 can lock an outer edge portion of the outer friction plate 72 located closest to the driven cam 50 among the multiple outer friction plates 72. Therefore, the multiple outer friction plates 72 and the multiple inner friction plates 71 are restricted from coming off from the inside of the cylinder portion 623. A distance between the locking portion 701 and the friction plate 624 is larger than a sum of plate thicknesses of the multiple outer friction plates 72 and the multiple inner friction plates 71.

In an engaged state in which the multiple inner friction plates 71 and the multiple outer friction plates 72 come into contact with each other, that is, are engaged with each other, a frictional force is generated between the inner friction plates 71 and the outer friction plates 72, and relative rotation between the inner friction plates 71 and the outer friction plates 72 is restricted according to a magnitude of the frictional force. On the other hand, in a non-engaged state in which the multiple inner friction plates 71 and the multiple outer friction plates 72 are separated from each other, that is, are not engaged with each other, no frictional force is generated between the inner friction plates 71 and the outer friction plates 72, and the relative rotation between the inner friction plates 71 and the outer friction plates 72 is not restricted.

When the clutch 70 is in the engaged state, the torque input to the input shaft 61 is transmitted to the output shaft 62 via the clutch 70. On the other hand, when the clutch 70 is in the non-engaged state, the torque input to the input shaft 61 is not transmitted to the output shaft 62.

In this way, the clutch 70 transmits the torque between the input shaft 61 and the output shaft 62. The clutch 70 permits torque transmission between the input shaft 61 and the output shaft 62 during the engaged state in which the clutch 70 is engaged, and blocks the torque transmission between the input shaft 61 and the output shaft 62 during the non-engaged state in which the clutch 70 is not engaged.

In the present embodiment, the clutch device 1 is a so-called normally open type clutch device that is normally in the non-engaged state.

The state changing unit 80 includes a disk spring 81 serving as an "elastic deformation portion", a disk spring retainer 82, and a thrust bearing 83. The disk spring retainer 82 includes a retainer cylinder portion 821 and a retainer flange portion 822. The retainer cylinder portion 821 is formed in a substantially cylindrical shape. The retainer flange portion 822 is formed in an annular plate shape to extend from one end of the retainer cylinder portion 821 to the radially outer side. The retainer cylinder portion 821 and the retainer flange portion 822 are integrally formed of, for example, metal. The disk spring retainer 82 is fixed to the driven cam 50 such that an outer peripheral wall of the other end of the retainer cylinder portion 821 is fitted to an inner peripheral wall of the driven cam cylinder portion 52.

The disk spring 81 is provided such that an inner edge portion is located between the driven cam cylinder portion 52 and the retainer flange portion 822 on the radially outer side of the retainer cylinder portion 821. The thrust bearing 83 is provided between the driven cam cylinder portion 52 and the disk spring 81.

The disk spring retainer 82 is fixed to the driven cam 50 such that the retainer flange portion 822 can lock one end of the disk spring 81 in the axial direction, that is, the inner edge portion. Therefore, the disk spring 81 and the thrust bearing 83 are restricted from coming off from the disk spring retainer 82 by the retainer flange portion 822. The disk spring 81 is elastically deformable in the axial direction.

As shown in FIGS. 1, 2, 7, and 8, when the ball 3 is located at a position (origin) corresponding to a deepest portion which is a portion farthest from the one end surface 411 of the drive cam groove 400 in the axial direction of the drive cam main body 41, that is, in a depth direction, and at a position (origin) corresponding to a deepest portion which is a portion farthest from the one end surface 511 of the driven cam groove 500 in the axial direction of the driven cam main body 51, that is, in the depth direction, a distance between the drive cam 40 and the driven cam 50 is relatively small, and a gap Sp1 is formed between the clutch 70 and the other end of the disk spring 81 in the axial direction, that is, an outer edge portion (see FIG. 1). Therefore, the clutch 70 is in the non-engaged state, and the torque transmission between the input shaft 61 and the output shaft 62 is blocked.

Here, when electric power is supplied to the coil 22 of the motor 20 under control of the ECU 10 during normal operation for changing the state of the clutch 70, the motor 20 rotates, the torque is output from the speed reducer 30, and the drive cam 40 rotates relative to the housing 12. Accordingly, the ball 3 rolls from the position corresponding to the deepest portion to one side in the circumferential direction of the drive cam groove 400 and the driven cam groove 500. Accordingly, the driven cam 50 moves relative to the housing 12 in the axial direction, that is, moves toward the clutch 70 while compressing the return spring 55. Accordingly, the disk spring 81 moves toward the clutch 70.

When the disk spring 81 moves toward the clutch 70 due to the movement of the driven cam 50 in the axial direction, the gap Sp1 decreases, and the other end of the disk spring 81 in the axial direction comes into contact with the outer friction plate 72 of the clutch 70. When the driven cam 50 further moves in the axial direction after the disk spring 81 comes into contact with the clutch 70, the disk spring 81 pushes the outer friction plate 72 toward the friction plate 624 while elastically deforming in the axial direction. Accordingly, the multiple inner friction plates 71 and the multiple outer friction plates 72 are engaged with each other, and the clutch 70 is in the engaged state. Therefore, the torque transmission between the input shaft 61 and the output shaft 62 is permitted.

At this time, the disk spring 81 rotates relative to the driven cam 50 and the disk spring retainer 82 while being bearing-supported by the thrust bearing 83. In this way, the thrust bearing 83 bearing-supports the disk spring 81 while receiving a load in a thrust direction from the disk spring 81.

When a clutch transmission torque reaches a clutch required torque capacity, the ECU 10 stops the rotation of the motor 20. Accordingly, the clutch 70 is in an engagement maintaining state where the clutch transmission torque is maintained at the clutch required torque capacity. In this way, the disk spring 81 of the state changing unit 80 can receive a force in the axial direction from the driven cam 50, and can change the state of the clutch 70 to the engaged state or the non-engaged state according to the relative position of the driven cam 50 in the axial direction with respect to the housing 12 and the drive cam 40.

An end portion of the shaft portion 621 on a side opposite to the plate portion 622 is connected to an input shaft of a transmission (not shown), and the output shaft 62 is rotatable together with the input shaft. That is, the torque output from the output shaft 62 is input to the input shaft of the transmission. The torque input to the transmission is changed in speed by the transmission, and is output to a drive wheel of the vehicle as a drive torque. Accordingly, the vehicle travels.

Next, the 3k-type strange planetary gear speed reducer employed by the speed reducer 30 according to the present embodiment will be described.

In an electric clutch device as in the present embodiment, it is required to shorten a time required for an initial response to reduce an initial gap (corresponding to the gap Sp1) between a clutch and an actuator. In order to speed up the initial response, it is understood from a rotational motion equation that an inertia moment around an input shaft is required to be reduced. The inertia moment when the input shaft is a solid cylindrical member increases in proportion to a fourth power of an outer diameter when a length and density are constant. In the clutch device 1 according to the present embodiment, the sun gear 31 corresponding to the "input shaft" here is a hollow cylindrical member, and this tendency does not change.

Figure 3:
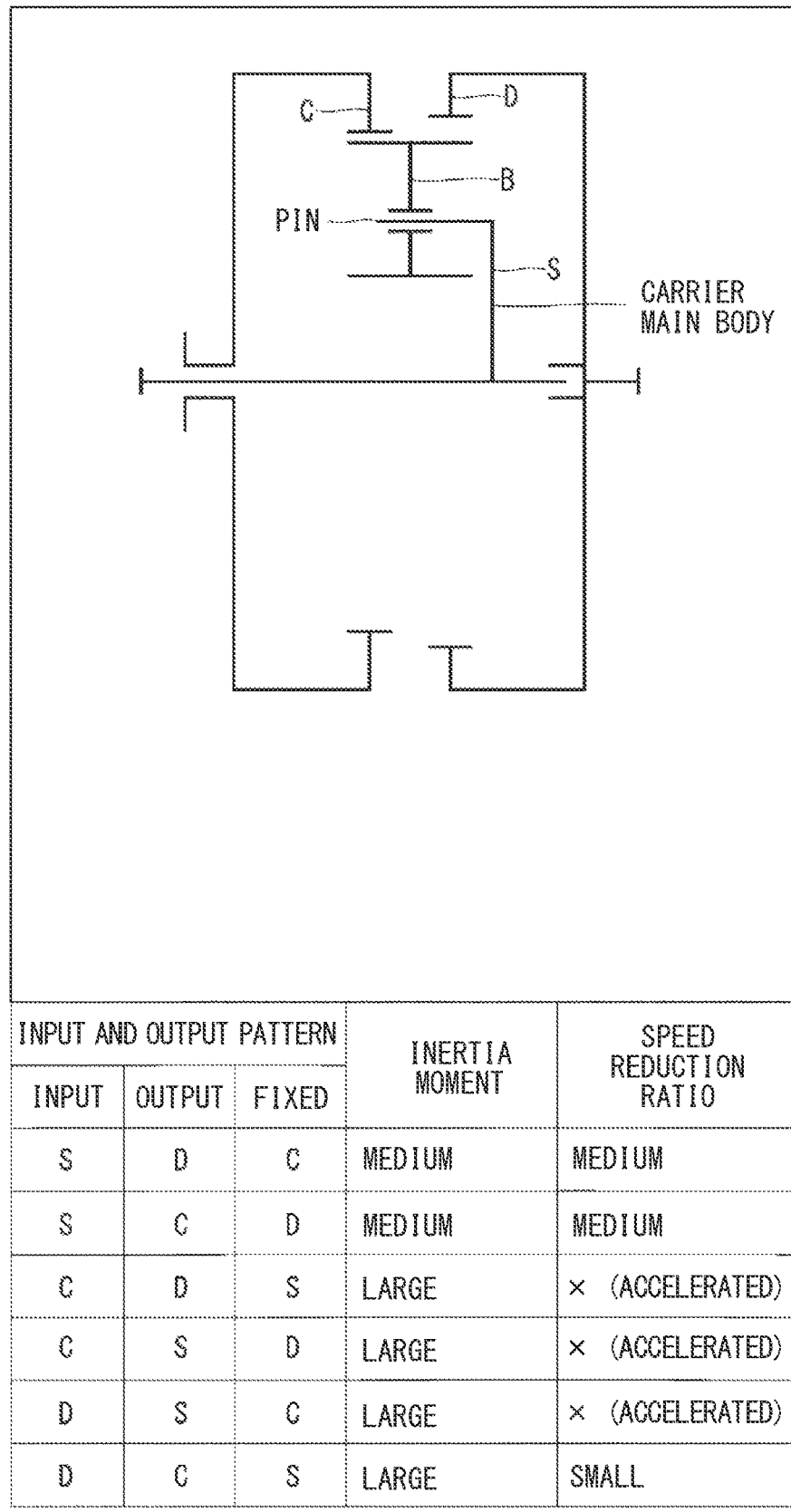
FIG. 3 is a schematic diagram of a 2kh-type strange planetary gear speed reducer, and a table showing a relationship among an input and output pattern, an inertia moment, and a speed reduction ratio.
Figure 4:
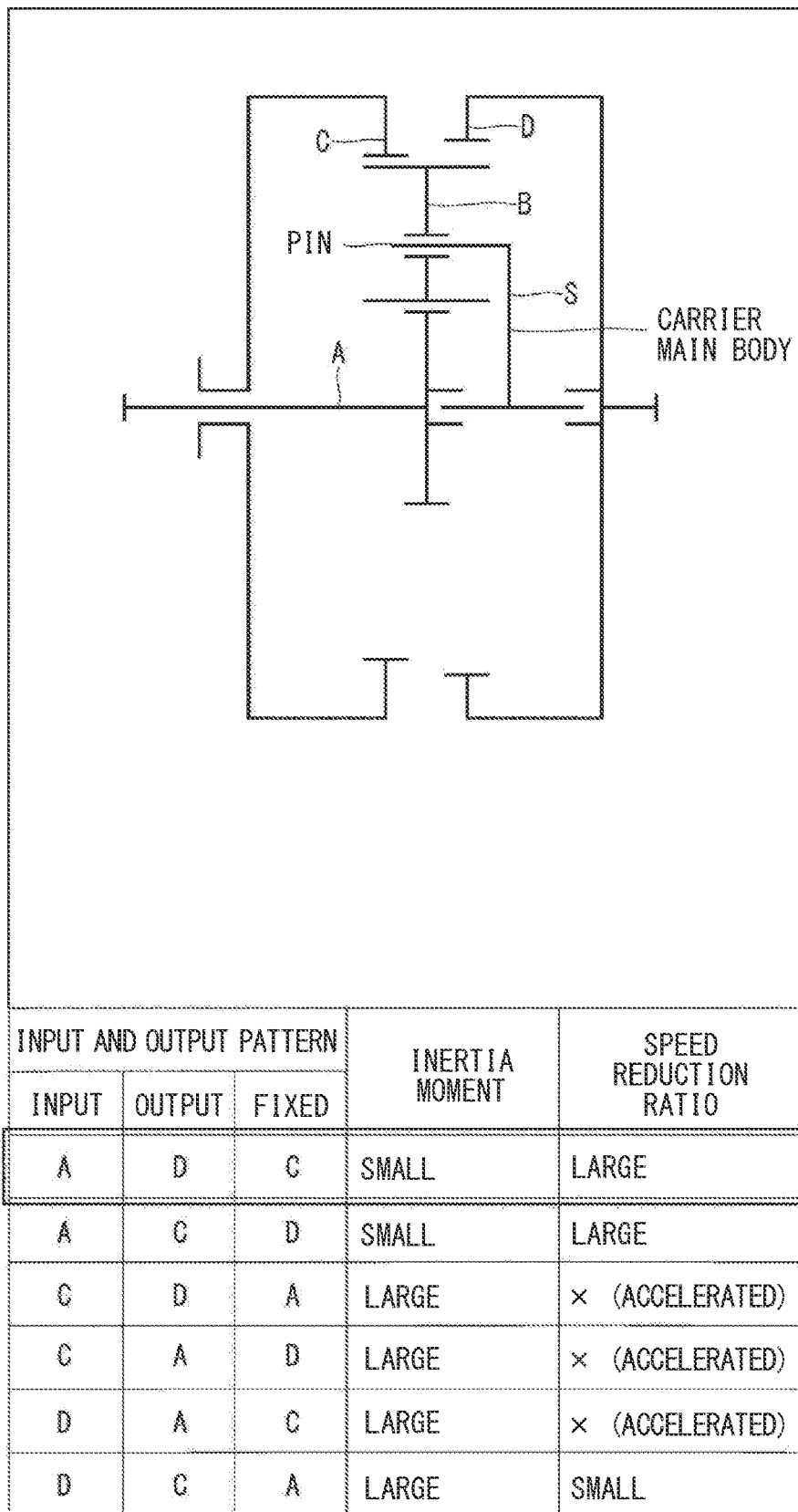
FIG. 4 is a schematic diagram of a 3k-type strange planetary gear speed reducer, and a table showing a relationship among an input and output pattern, an inertia moment, and a speed reduction ratio.

An upper part of FIG. 3 shows a schematic diagram of a 2kh-type strange planetary gear speed reducer. In addition, an upper part of FIG. 4 shows a schematic diagram of the 3k-type strange planetary gear speed reducer. Here, the sun gear is referred to as A, the planetary gear is referred to as B, the first ring gear is referred to as C, the second ring gear is referred to as D, and the carrier is referred to as S. Comparing the 2kh-type and the 3k-type, the 3k-type has a configuration in which the sun gear A is added to the 2kh-type.

In the case of the 2kh-type, when the carrier S located on a most radially inner side among the components is used as an input element, the inertia moment around the input shaft is the smallest (see a table in a lower part of FIG. 3).

On the other hand, in the case of the 3k-type, when the sun gear A located on a most radially inner side among the components is used as an input element, the inertia moment around the input shaft is the smallest (see a table in a lower part of FIG. 4).

A magnitude of the inertia moment is larger in the case of the 2kh-type strange planetary gear speed reducer using the carrier S as an input element than in the case of the 3k-type strange planetary gear speed reducer using the sun gear A as an input element. Therefore, in an electric clutch device in which a speed of the initial response is required, when a strange planetary gear speed reducer is employed as the speed reducer, it is desirable that the 3k-type is used and the sun gear A is used as an input element.

In addition, in the electric clutch device, the required load is very large from several thousand to ten thousand N, and in order to achieve both a high response and a high load, it is necessary to increase a speed reduction ratio of the speed reducer. Comparing maximum speed reduction ratios of the same gear specifications of the 2kh-type and the 3k-type, the maximum speed reduction ratio of the 3k-type is about 2 times the maximum speed reduction ratio of the 2kh-type, which is large. In addition, in the case of the 3k-type, when the sun gear A having a smallest inertia moment is used as an input element, a large speed reduction ratio can be obtained (see the table in the lower part of FIG. 4). Therefore, it can be said that an optimal configuration for achieving both the high response and the high load is a configuration in which the 3k-type is used and the sun gear A is used as an input element.

In the present embodiment, the speed reducer 30 is a 3k-type strange planetary gear speed reducer in which the sun gear 31 (A) is used as an input element, the second ring gear 35 (D) is used as an output element, and the first ring gear 34 (C) is used as a fixed element. Therefore, an inertia moment around the sun gear 31 can be reduced, and a speed reduction ratio of the speed reducer 30 can be increased. Therefore, both the high response and the high load in the clutch device 1 can be achieved.

In the case of the 2kh-type, since the carrier S directly contributes to power transmission, in a configuration in which the planetary gear B is supported in a cantilever manner on a main body of the carrier S by a pin, there is a concern that a large bending moment may act between a rotation support shaft (pin) of the planetary gear B and the main body of the carrier S (see the schematic diagram in the upper part of FIG. 3).

On the other hand, in the case of the 3k-type, since the carrier S has only a function of holding the planetary gear B at an appropriate position with respect to the sun gear A, the first ring gear C, and the second ring gear D, the bending moment acting between the rotation support shaft (pin) of the planetary gear B and the main body of the carrier S is small (see the schematic diagram in the upper part of FIG. 4).

Therefore, in the present embodiment, by making the speed reducer 30 as a 3k-type strange planetary gear speed reducer have a high response and a high load, the planetary gear 32 can be supported from one side in the axial direction, that is, can be supported in a cantilever manner by the carrier main body 330 and the pin 331 without impairing responsiveness and durability of the clutch device 1.

Next, an effect of the state changing unit 80 including the disk spring 81 as the elastic deformation portion will be described.

Figure 5:
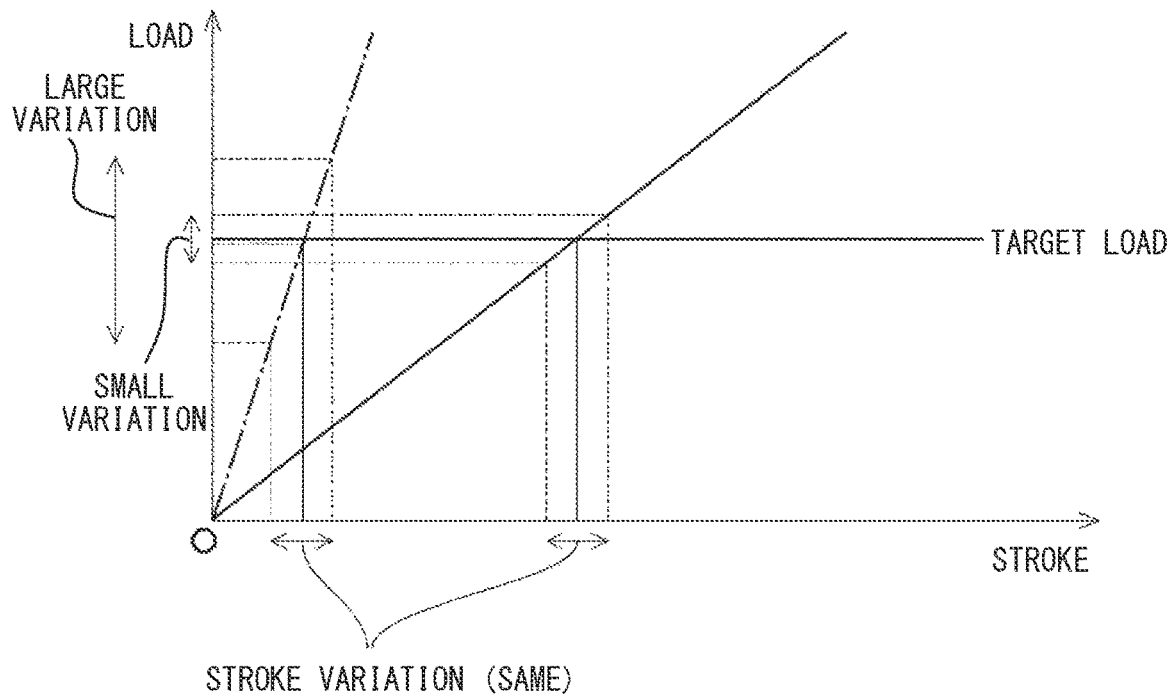
FIG. 5 is a diagram showing a relationship between a stroke of a driven cam and a load acting on a clutch.

As shown in FIG. 5, regarding a relationship between the movement of the driven cam 50 in the axial direction, that is, the stroke and a load acting on the clutch 70, when comparing a configuration in which the clutch 70 is pushed by a rigid body that is difficult to elastically deform in the axial direction (see an alternate long and short dash line in FIG. 5) and a configuration in which the clutch 70 is pushed by the disk spring 81 that is elastically deformable in the axial direction as in the present embodiment (see a solid line in FIG. 5), it can be seen that, when variations in the stroke are the same, a variation in the load acting on the clutch 70 is smaller in the configuration in which the clutch 70 is pushed by the disk spring 81 than in the configuration in which the clutch 70 is pushed by the rigid body. This is because, as compared with the configuration in which the clutch 70 is pushed by the rigid body, a combined spring constant can be reduced by using the disk spring 81, so that the variation in the load with respect to the variation in the stroke of the driven cam 50 caused by the actuator can be reduced. In the present embodiment, since the state changing unit 80 includes the disk spring 81 as the elastic deformation portion, the variation in the load with respect to the variation in the stroke of the driven cam 50 can be reduced, and a target load can be easily applied to the clutch 70.

Hereinafter, the configuration of each portion of the present embodiment will be described in more detail.

In the present embodiment, the clutch device 1 includes an oil supply portion 5 (see FIGS. 1 and 2). The oil supply portion 5 is formed in a passage shape in the output shaft 62 such that one end is exposed to the clutch space 620. The other end of the oil supply portion 5 is connected to an oil supply source (not shown). Accordingly, oil is supplied from the one end of the oil supply portion 5 to the clutch 70 in the clutch space 620.

The ECU 10 controls an amount of oil supplied from the oil supply portion 5 to the clutch 70. The oil supplied to the clutch 70 can lubricate and cool the clutch 70. In this way, in the present embodiment, the clutch 70 is a wet clutch and can be cooled by oil.

In the present embodiment, the ball cam 2 as a "rotational translation unit" forms the accommodation space 120 between the drive cam 40 as a "rotation portion" and the housing 12, and between the second ring gear 35 and the housing 12. Here, the accommodation space 120 is formed on the inside of the housing 12 on a side opposite to the clutch 70 with respect to the drive cam 40 and the second ring gear 35. The motor 20 and the speed reducer 30 are provided in the accommodation space 120. The clutch 70 is provided in the clutch space 620, which is a space on a side opposite to the accommodation space 120 with respect to the drive cam 40.

In the present embodiment, the clutch device 1 includes the thrust bearing 161 and a thrust bearing washer 162. The thrust bearing washer 162 is formed of, for example, metal in a substantially annular plate shape, and is provided such that one surface is in contact with the housing step surface 125. The thrust bearing 161 is provided between the other surface of the thrust bearing washer 162 and a surface of the drive cam main body 41 on a side opposite to the driven cam 50. The thrust bearing 161 bearing-supports the drive cam 40 while receiving a load in the thrust direction from the drive cam 40. In the present embodiment, a load in the thrust direction acting on the drive cam 40 from the clutch 70 side via the driven cam 50 acts on the housing step surface 125 via the thrust bearing 161 and the thrust bearing washer 162. Therefore, the drive cam 40 can be stably bearing-supported by the housing step surface 125.

In the present embodiment, the clutch device 1 includes an inner sealing member 191 and an outer sealing member 192 as "seal members". The inner sealing member 191 and the outer sealing member 192 are oil seals annularly formed of an elastic material such as rubber and a metal ring.

An inner diameter and an outer diameter of the inner sealing member 191 are smaller than an inner diameter and an outer diameter of the outer sealing member 192.

The inner sealing member 191 is located between the housing inner cylinder portion 121 and the thrust bearing 161 in the radial direction, and is located between the thrust bearing washer 162 and the drive cam main body 41 in the axial direction. The inner sealing member 191 is fixed to the housing inner cylinder portion 121 and is rotatable relative to the drive cam 40.

The outer sealing member 192 is provided between the gear inner cylinder portion 355 of the second ring gear 35 and an end portion of the housing outer cylinder portion 123 on the clutch 70 side. The outer sealing member 192 is fixed to the housing outer cylinder portion 123 and is rotatable relative to the second ring gear 35.

Here, the outer sealing member 192 is provided to be located on the radially outer side of the inner sealing member 191 when viewed in the axial direction of the inner sealing member 191 (see FIGS. 1 and 2).

A surface of the drive cam main body 41 on a thrust bearing washer 162 side is slidable on a seal lip portion of the inner sealing member 191. That is, the inner sealing member 191 is provided to come into contact with the drive cam 40 as a "rotation portion". The inner sealing member 191 seals the drive cam main body 41 and the thrust bearing washer 162 in an airtight or liquid-tight manner.

An outer peripheral wall of the gear inner cylinder portion 355 of the second ring gear 35 is slidable on a seal lip portion, which is an inner edge portion of the outer sealing member 192. That is, the outer sealing member 192 is provided to come into contact with the second ring gear 35 that rotates integrally with the drive cam 40 on the radially outer side of the drive cam 40 as a "rotation portion". The outer sealing member 192 seals the outer peripheral wall of the gear inner cylinder portion 355 and the inner peripheral wall of the housing outer cylinder portion 123 in an airtight or liquid-tight manner.

By the inner sealing member 191 and the outer sealing member 192 provided as described above, the accommodation space 120 in which the motor 20 and the speed reducer 30 are accommodated and the clutch space 620 in which the clutch 70 is provided can be maintained in an airtight or liquid-tight manner. Accordingly, for example, even if a foreign matter such as abrasion powder is generated in the clutch 70, the foreign matter can be restricted from entering the accommodation space 120 from the clutch space 620. Therefore, an operation failure of the motor 20 or the speed reducer 30 caused by the foreign matter can be reduced.

In the present embodiment, since the accommodation space 120 and the clutch space 620 are maintained in an airtight or liquid-tight manner by the inner sealing member 191 and the outer sealing member 192, even if the foreign matter such as the abrasion powder is contained in the oil supplied to the clutch 70, the oil containing the foreign matter can be restricted from flowing into the accommodation space 120 from the clutch space 620.

In the present embodiment, the housing 12 is formed to have a closed shape from a portion corresponding to the radially outer side of the outer sealing member 192 to a portion corresponding to the radially inner side of the inner sealing member 191 (see FIGS. 1 and 2).

In the present embodiment, although the drive cam 40 and the second ring gear 35 forming the accommodation space 120 with the housing 12 rotate relative to the housing 12, the drive cam 40 and the second ring gear 35 do not move relative to the housing 12 in the axial direction. Therefore, when the clutch device 1 is operated, a change in capacity of the accommodation space 120 can be reduced, and generation of a negative pressure in the accommodation space 120 can be reduced. Accordingly, the oil or the like containing the foreign matter can be restricted from being suctioned into the accommodation space 120 from the clutch space 620.

The inner sealing member 191 to come into contact with the inner edge portion of the drive cam 40 slides on the drive cam 40 in the circumferential direction, but does not slide in the axial direction. In addition, the outer sealing member 192 to come into contact with the outer peripheral wall of the gear inner cylinder portion 355 of the second ring gear 35 slides on the second ring gear 35 in the circumferential direction, but does not slide in the axial direction.

As shown in FIG. 1, the drive cam main body 41 is located on a side opposite to the clutch 70 with respect to the drive cam outer cylinder portion 44. That is, the drive cam 40 as a "rotation portion" is bent in the axial direction to be formed such that the drive cam main body 41, which is the inner edge portion of the drive cam 40, and the drive cam outer cylinder portion 44, which is an outer edge portion of the drive cam 40, are located at different positions in the axial direction.

The driven cam main body 51 is provided to be located on the radially inner side of the drive cam inner cylinder portion 42 in the clutch 70 side of the drive cam main body 41. That is, the drive cam 40 and the driven cam 50 are provided in a nested manner in the axial direction.

More specifically, the driven cam main body 51 is located on the radially inner side of the gear plate portion 356, the gear outer cylinder portion 357 of the second ring gear 35, the drive cam plate portion 43, and the drive cam inner cylinder portion 42. In addition, the sun gear tooth portion 311 of the sun gear 31, the carrier 33, and the planetary gears 32 are located on the radially outer side of the drive cam main body 41 and the driven cam main body 51. Accordingly, a size of the clutch device 1 in the axial direction including the speed reducer 30 and the ball cam 2 can be significantly reduced.

In the present embodiment, as shown in FIG. 1, the drive cam main body 41, the sun gear 31, the carrier 33, and the coil 22 are arranged to partially overlap with each other in an axial direction of the drive cam main body 41. In other words, a part of the coil 22 is provided to be located on the radially outer side of a part of the drive cam main body 41, the sun gear 31, and the carrier 33 in the axial direction. Accordingly, the size of the clutch device 1 in the axial direction can be further reduced.

Next, more detailed configurations of the drive cam groove 400 and the driven cam groove 500 will be described.

As shown in FIG. 7, the drive cam groove 400 includes a first drive cam groove 401 and a second drive cam groove 402. The first drive cam groove 401 extends from a drive cam specific position PSd1, which is a specific position in the circumferential direction of the drive cam main body 41 of the drive cam 40, to one side in the circumferential direction of the drive cam main body 41, and is formed with a groove bottom 403 inclined with respect to the one end surface 411 of the drive cam main body 41 such that a depth becomes shallower from the drive cam specific position PSd1 toward the one side in the circumferential direction of the drive cam main body 41.

The second drive cam groove 402 extends from the drive cam specific position PSd1 to the other side in the circumferential direction of the drive cam main body 41, is provided with a groove bottom 403 inclined with respect to the one end surface 411 of the drive cam main body 41 such that a depth becomes shallower from the drive cam specific position PSd1 toward the other side in the circumferential direction of the drive cam main body 41, and in which an inclination angle of the groove bottom 403 with respect to the one end surface 411 of the drive cam main body 41 is larger than an inclination angle of the groove bottom 403 of the first drive cam groove 401. In the circumferential direction of the drive cam main body 41, the drive cam specific position PSd1 and the deepest portion of the drive cam groove 400 coincide with each other.

As shown in FIG. 8, the driven cam groove 500 includes a first driven cam groove 501 and a second driven cam groove 502. The first driven cam groove 501 extends from a driven cam specific position PSv1, which is a specific position in the circumferential direction of the driven cam main body 51 of the driven cam 50, to one side in the circumferential direction of the driven cam main body 51, and is formed with a groove bottom 503 inclined with respect to the one end surface 511 of the driven cam main body 51 such that a depth becomes shallower from the driven cam specific position PSv1 toward the one side in the circumferential direction of the driven cam main body 51.

The second driven cam groove 502 extends from the driven cam specific position PSv1 to the other side in the circumferential direction of the driven cam main body 51, is provided with a groove bottom 503 inclined with respect to the one end surface 511 of the driven cam main body 51 such that a depth becomes shallower from the driven cam specific position PSv1 toward the other side in the circumferential direction of the driven cam main body 51, and in which an inclination angle of the groove bottom 503 with respect to the one end surface 511 of the driven cam main body 51 is larger than an inclination angle of the groove bottom 503 of the first driven cam groove 501. In the circumferential direction of the driven cam main body 51, the driven cam specific position PSv1 and the deepest portion of the driven cam groove 500 coincide with each other. In addition, the inclination angle of the groove bottom 403 of the first drive cam groove 401 is the same as the inclination angle of the groove bottom 503 of the first driven cam groove 501. Further, the inclination angle of the groove bottom 403 of the second drive cam groove 402 is the same as the inclination angle of the groove bottom 503 of the second driven cam groove 502.

As shown in FIG. 7, on the one end surface 411 of the drive cam main body 41, a circumferential angle $\theta d2$ of an entire trajectory LLd2 along the groove bottom 403 of the second drive cam groove 402 is smaller than a circumferential angle $\theta d1$ of an entire trajectory LLd1 along the groove bottom 403 of the first drive cam groove 401. Here, the circumferential angle $\theta d2$ corresponds to an angle formed between a straight line connecting a center Od1 of the drive cam main body 41 and the drive cam specific position PSd1 and a straight line connecting the center Od1 and an end portion of the groove bottom 403 and the trajectory LLd2 of the second drive cam groove 402. In addition, the circumferential angle $\theta d1$ corresponds to an angle formed between a straight line connecting the center Od1 of the drive cam 40 and the drive cam specific position PSd1 and a straight line connecting the center Od1 and an end portion of the groove bottom 403 and the trajectory LLd1 of the first drive cam groove 401.

As shown in FIG. 8, on the one end surface 511 of the driven cam main body 51, a circumferential angle $\theta v2$ of an entire trajectory LLv2 along the groove bottom 503 of the second driven cam groove 502 is smaller than a circumferential angle $\theta v1$ of an entire trajectory LLv1 along the groove bottom 503 of the first driven cam groove 501. Here, the circumferential angle $\theta v2$ corresponds to an angle formed between a straight line connecting a center Ov1 of the driven cam main body 51 and the driven cam specific position PSv1 and a straight line connecting the center Ov1 and an end portion of the groove bottom 503 and the trajectory LLv2 of the second driven cam groove 502. In addition, the circumferential angle θv1 corresponds to an angle formed between a straight line connecting the center Ov1 of the driven cam 50 and the driven cam specific position PSv1 and a straight line connecting the center Ov1 and an end portion of the groove bottom 503 and the trajectory LLv1 of the first driven cam groove 501.

As shown in FIG. 7, three drive cam grooves 400 having the same configuration are formed in the drive cam main body 41 at equal intervals in the circumferential direction of the drive cam main body 41. The first drive cam groove 401 and the second drive cam groove 402 of the drive cam groove 400 are formed such that a distance Rd1 between the center Od1 of the drive cam main body 41 and the groove bottoms 403 is constant on the one end surface 411 of the drive cam main body 41.

As shown in FIG. 8, three driven cam grooves 500 having the same configuration are formed in the driven cam main body 51 at equal intervals in the circumferential direction of the driven cam main body 51. The first driven cam groove 501 and the second driven cam groove 502 of the driven cam groove 500 are formed such that a distance Rv1 between the center Ov1 of the driven cam main body 51 and the groove bottoms 503 is constant on the one end surface 511 of the driven cam main body 51.

The ECU 10 controls operations of the switching elements 271 to 276, thereby controlling the energization to the winding set 25 and controlling the operation of the motor 20. In addition, the ECU 10 can determine a "normal state where the winding set 25 is not disconnected" or an "abnormal state where the winding group 25 is disconnected" based on the voltage detected by the voltage detection unit 250.

During the normal state where the winding set 25 is not disconnected, the ECU 10 controls the operation of the motor 20 such that the balls 3 roll in the first drive cam grooves 401 and the first driven cam grooves 501. At this time, the ECU 10 outputs the torque from the motor 20 by energizing the winding set 25, and rotates the drive cam 40 relative to the driven cam 50 such that the balls 3 roll in the first drive cam grooves 401 and the first driven cam grooves 501. Accordingly, the driven cam 50 moves relative to the drive cam 40 and the housing 12 in the axial direction, and an engagement state of the clutch 70 changes to the non-engaged state or the engaged state. Here, a time period during which the winding set 25 of the coil 22 of the motor 20 is energized, the ball cam 2 is operated, and the state of the clutch 70 is changed to the engaged state or the non-engaged state is referred to as "during normal operation".

Next, the operation and the like of the clutch device 1 will be described in more detail. FIGS. 9 to 11, 13, and 14 show a cross section of a curved surface that passes through the groove bottom 403 of the drive cam groove 400 and the groove bottom 503 of the driven cam groove 500 and is perpendicular to the one end surface 411 of the drive cam main body 41 and the one end surface 511 of the driven cam main body 51.

Figure 9:
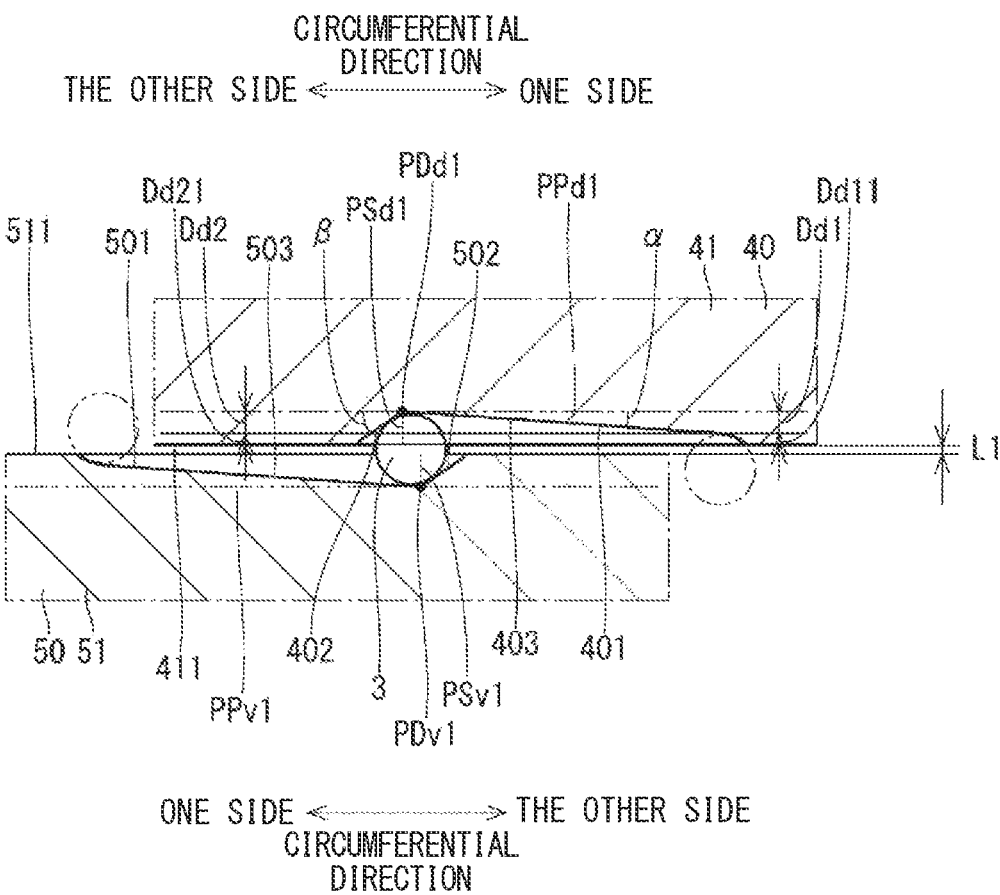
FIG. 9 is a cross-sectional view showing a drive cam groove and a driven cam groove of the clutch device according to the first embodiment.

As shown in FIG. 9, when the energization to the motor 20 is stopped, the ball 3 is located at the drive cam specific position PSd1 and the driven cam specific position PSv1, that is, at the origin that is the initial position. At this time, the ball 3 is in contact with the groove bottoms 403 of the first drive cam groove 401 and the second drive cam groove 402, and is in contact with the groove bottoms 503 of the first driven cam groove 501 and the second driven cam groove 502. In addition, the one end surface 411 of the drive cam main body 41 and the one end surface 511 of the driven cam main body 51 are separated by a distance L1. During an "origin state" where the ball 3 is located at the origin, an amount of movement of the driven cam 50 in the axial direction toward the clutch 70 is zero. Therefore, the state at this time is also referred to as a "stroke zero state".

Here, when the inclination angle of the groove bottom 403 of the first drive cam groove 401 with respect to the one end surface 411 is α, and the inclination angle of the groove bottom 403 of the second drive cam groove 402 with respect to the one end surface 411 is β, α<β. In addition, the inclination angle of the groove bottom 503 of the first driven cam groove 501 with respect to the one end surface 511 is smaller than the inclination angle of the groove bottom 503 of the second driven cam groove 502 with respect to the one end surface 511.

Figure 10:
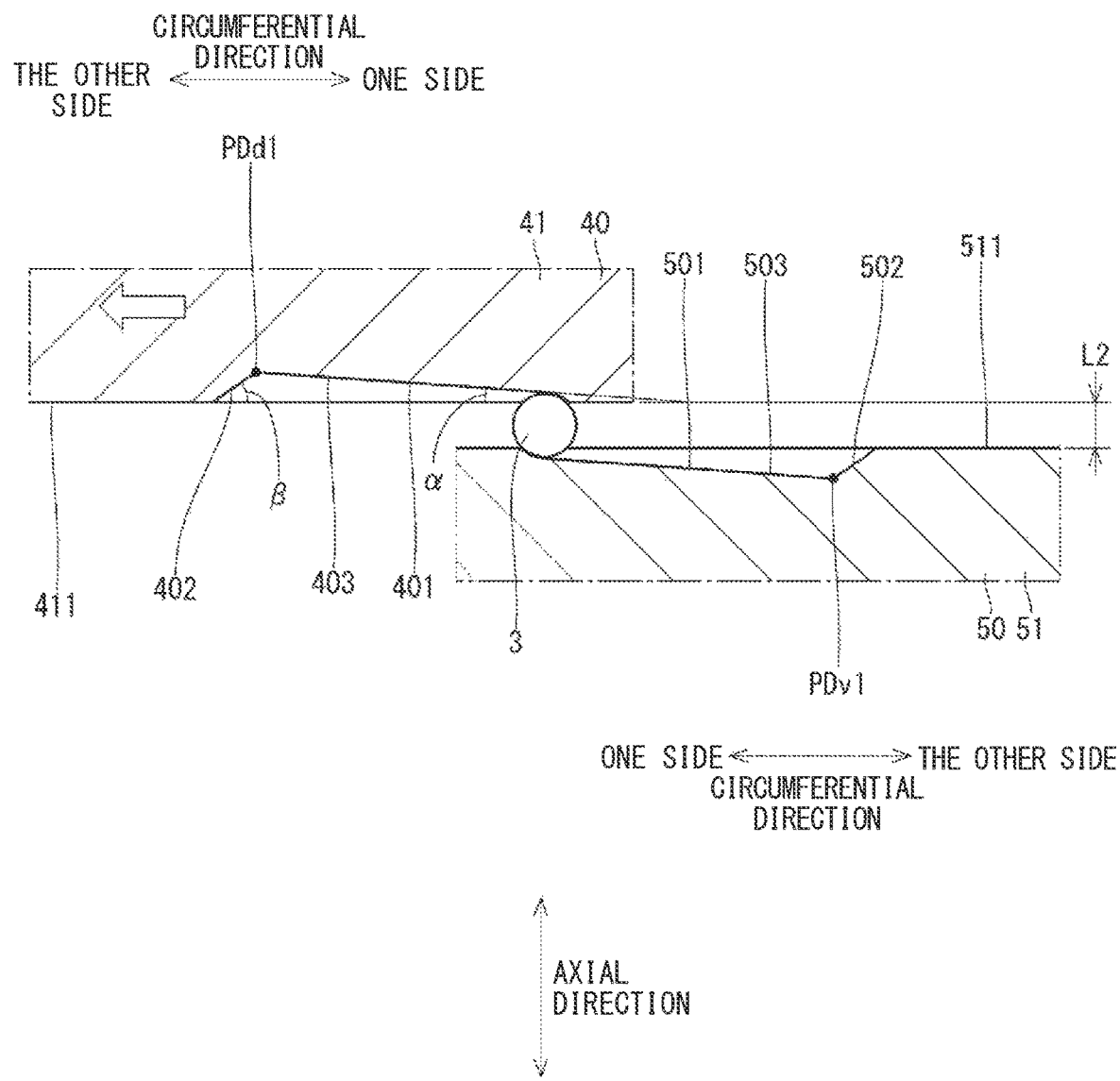
FIG. 10 is a cross-sectional view showing the drive cam groove and the driven cam groove of the clutch device according to the first embodiment, which is a diagram showing a state different from that of FIG. 9.
Figure 11:
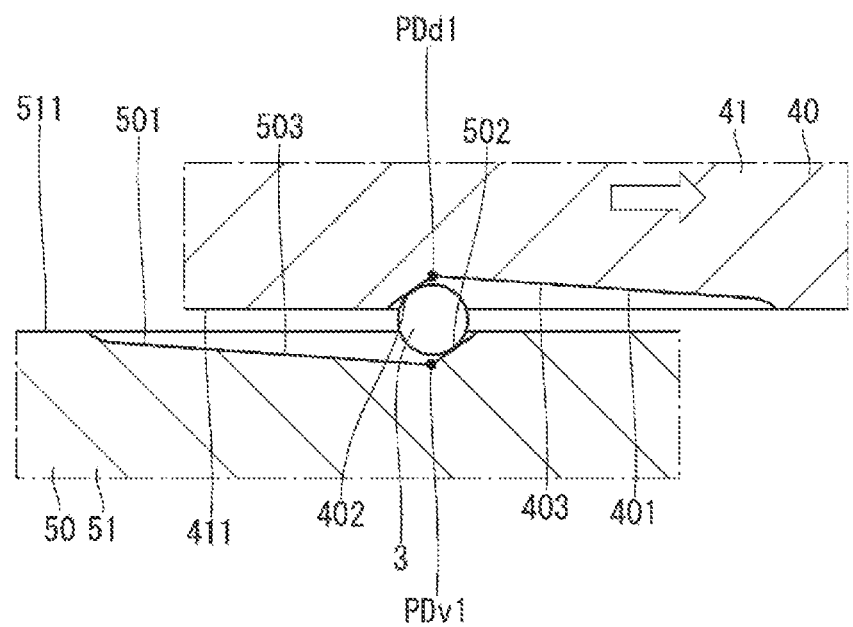
FIG. 11 is a cross-sectional view showing the drive cam groove and the driven cam groove of the clutch device according to the first embodiment, which is a diagram showing a state different from that of FIG. 9.

When the motor 20 rotates by the energization during normal operation in the normal state where the winding set 25 is not disconnected, the ball 3 rolls in the first drive cam groove 401 and the first driven cam groove 501, and reaches an end portion of the first drive cam groove 401 on a side opposite to the drive cam specific position PSd1 and an end portion of the first driven cam groove 501 on a side opposite to the driven cam specific position PSv1 (see FIG. 10). At this time, the one end surface 411 of the drive cam main body 41 and the one end surface 511 of the driven cam main body 51 are separated by a distance L2. In addition, at this time, the amount of movement of the driven cam 50 in the axial direction toward the clutch 70 is maximized. Therefore, the state at this time is also referred to as a "maximum stroke state".

In the maximum stroke state (see FIG. 10), for example, when the energization to the motor 20 is blocked by a power supply failure due to the disconnection or the like of the winding set 25, the driven cam 50 restores to the initial position side by an urging force of the return spring 55 from the clutch 70 side or the like. At this time, the ball 3 rolls in the first drive cam groove 401 and the first driven cam groove 501, passes through the origin between the first drive cam groove 401 and the second drive cam groove 402 and between the first driven cam groove 501 and the second driven cam groove 502, and runs onto the second drive cam groove 402 and the second driven cam groove 502 (see FIG. 11). At this time, the ball 3 is not in contact with the first drive cam groove 401 and the first driven cam groove 501, and is in contact with only the groove bottom 403 of the second drive cam groove 402 and the groove bottom 503 of the second driven cam groove 502.

As described above, when the power supply failure occurs from the maximum stroke state, the drive cam 40 and the motor 20 coupled to the drive cam 40 via the speed reducer 30 are reversely driven, and the ball 3 and the driven cam 50 restore to the origin position, all elastic energy of the clutch 70 and the return spring 55 is converted into rotational energy of a rotating member.

In a process in which the ball 3 runs onto the second drive cam groove 402 and the second driven cam groove 502 (see FIG. 11), the rotational energy is converted again to the elastic energy. In this process, considering loss due to friction, the ball 3 never runs onto a maximum stroke position of the second drive cam groove 402 and the second driven cam groove 502. Therefore, as long as a height from a deepest portion of an end portion of the second drive cam groove 402 and the second driven cam groove 502 on a side opposite to the initial position (origin) is at most the same as a height from a deepest portion of an end portion of the first drive cam groove 401 and the second drive cam groove 402 on a side opposite to the initial position (origin), impact energy during restoration to the origin can be absorbed with a margin.

In the present embodiment, when a plane parallel to the one end surface 411 of the drive cam main body 41 and passing through a drive cam specific point PDd1, which is a point on the groove bottom 403 of the drive cam groove 400 at the drive cam specific position PSd1, is defined as a drive cam specific virtual plane PPd1, a distance Dd2 between the drive cam specific virtual plane PPd1 and an end portion of the groove bottom 403 of the second drive cam groove 402 on a side opposite to the drive cam specific point PDd1 is set to be equal to or less than a distance Dd1 between the drive cam specific virtual plane PPd1 and an end portion of the groove bottom 403 of the first drive cam groove 401 on a side opposite to the drive cam specific point PDd1 (see FIG. 9). Here, the drive cam specific point PDd1 corresponds to the deepest portion of the drive cam groove 400. In addition, in the present embodiment, the groove bottom 403 of the first drive cam groove 401 and the groove bottom 403 of the second drive cam groove 402 respectively correspond to portions of a wall surface forming the drive cam groove 400 that have a constant inclination angle with respect to the one end surface 411 and the drive cam specific virtual plane PPd1.

Regarding the above configuration, in other words, the distance (Dd2) in the depth direction between the deepest portion and the end portion of the groove bottom 403 of the second drive cam groove 402 on the side opposite to the drive cam specific point PDd1 (deepest portion) is set to be equal to or less than the distance (Dd1) in the depth direction between the deepest portion and the end portion of the groove bottom 403 of the first drive cam groove 401 on the side opposite to the drive cam specific point PDd1 (deepest portion).

In the present embodiment, a distance Dd21 between the drive cam specific virtual plane PPd1 and an end portion of the second drive cam groove 402 on a side opposite to the drive cam specific point PDd1 (portion on the one end surface 411) is set to be equal to or smaller than a distance Dd11 between the drive cam specific virtual plane PPd1 and an end portion of the first drive cam groove 401 on a side opposite to the drive cam specific point PDd1 (portion on the one end surface 411) (see FIG. 9).

When a plane parallel to the one end surface 511 of the driven cam main body 51 and passing through a driven cam specific point PDv1, which is a point on the groove bottom 503 of the driven cam groove 500 at the driven cam specific position PSv1, is defined as a driven cam specific virtual plane PPv1, a distance between the driven cam specific virtual plane PPv1 and an end portion of the groove bottom 503 of the second driven cam groove 502 on a side opposite to the driven cam specific point PDv1 is set to be equal to or less than a distance between the driven cam specific virtual plane PPv1 and an end portion of the groove bottom 503 of the first driven cam groove 501 on a side opposite to the driven cam specific point PDv1 (see FIG. 9). Here, the driven cam specific point PDv1 corresponds to the deepest portion of the driven cam groove 500. In addition, in the present embodiment, the groove bottom 503 of the first driven cam groove 501 and the groove bottom 503 of the second driven cam groove 502 respectively correspond to portions of a wall surface forming the driven cam groove 500 that have a constant inclination angle with respect to the one end surface 511 and the driven cam specific virtual plane PPv1.

Regarding the above configuration, in other words, the distance in the depth direction between the deepest portion and the end portion of the groove bottom 503 of the second driven cam groove 502 on the side opposite to the driven cam specific point PDv1 (deepest portion) is set to be equal to or less than the distance in the depth direction between the deepest portion and the end portion of the groove bottom 503 of the first driven cam groove 501 on the side opposite to the driven cam specific point PDv1 (deepest portion).

In the present embodiment, a distance between the driven cam specific virtual plane PPv1 and an end portion of the second driven cam groove 502 on a side opposite to the driven cam specific point PDv1 (portion on the one end surface 511) is set to be equal to or less than a distance between the driven cam specific virtual plane PPv1 and an end portion of the first driven cam groove 501 on a side opposite to the driven cam specific point PDv1 (portion on the one end surface 511) (see FIG. 9).

Figure 12:
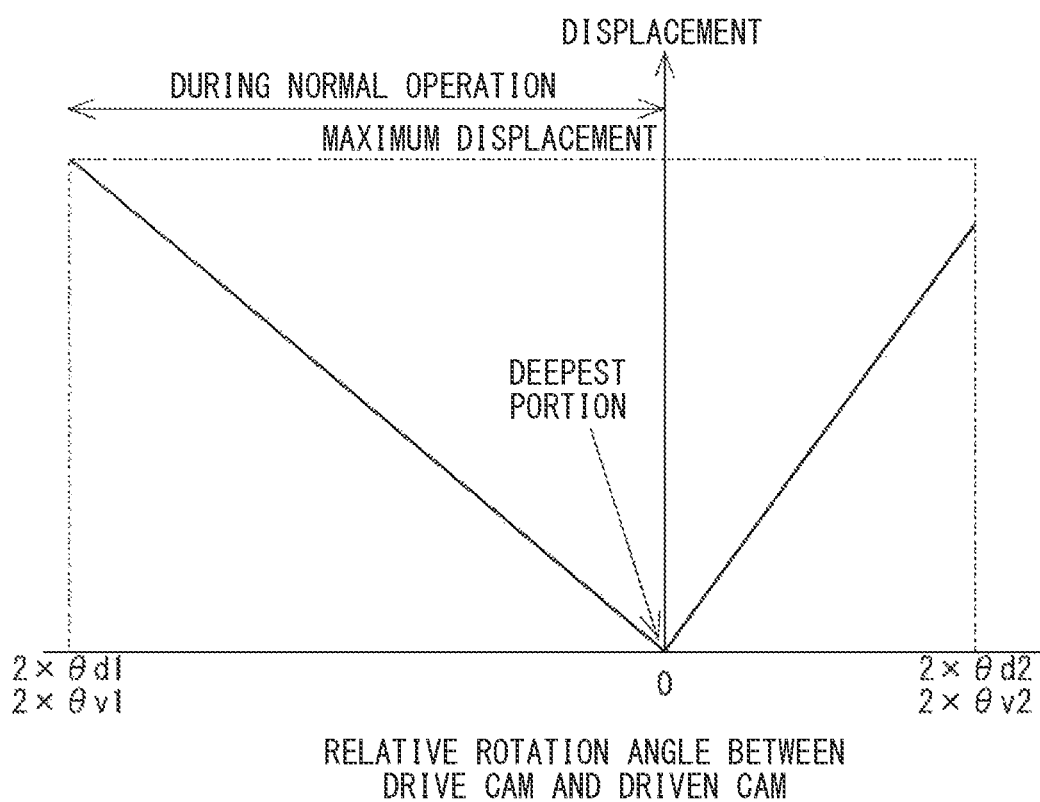
FIG. 12 is a diagram showing a relationship between a relative rotation angle between a drive cam and a driven cam of the clutch device according to the first embodiment and a displacement of the driven cam with respect to the drive cam.

A maximum displacement in the axial direction of the driven cam 50 with respect to the drive cam 40 during normal operation is L2–L1, and corresponds to a sum of a difference in groove depth between the deepest portion and a shallowest portion of the drive cam groove 400 and a difference in groove depth between the deepest portion and a shallowest portion of the driven cam groove 500. A relationship between the relative rotation angle between the drive cam 40 and the driven cam 50 and the displacement of the driven cam 50 with respect to the drive cam 40 is as shown in FIG. 12.

As shown in FIGS. 9 and 10, the inclination angle α of the groove bottom 403 of the first drive cam groove 401 with respect to the one end surface 411 of the drive cam main body 41 is the same as an inclination angle (α) of the groove bottom 403 of the first drive cam groove 401 with respect to the drive cam specific virtual plane PPd1. In addition, the inclination angle β of the groove bottom 403 of the second drive cam groove 402 with respect to the one end surface 411 of the drive cam main body 41 is the same as an inclination angle (β) of the groove bottom 403 of the second drive cam groove 402 with respect to the drive cam specific virtual plane PPd1.

Further, an inclination angle of the groove bottom 503 of the first driven cam groove 501 with respect to the one end surface 511 of the driven cam main body 51 is the same as an inclination angle of the groove bottom 503 of the first driven cam groove 501 with respect to the driven cam specific virtual plane PPv1. In addition, an inclination angle of the groove bottom 503 of the second driven cam groove 502 with respect to the one end surface 511 of the driven cam main body 51 is the same as an inclination angle of the groove bottom 503 of the second driven cam groove 502 with respect to the driven cam specific virtual plane PPv1.

Next, origin learning control performed by the ECU 10 will be described.

The ECU 10 performs origin learning control for storing, that is, learning an origin of the ball cam 2 at the time of starting or the like. By performing the origin learning control, the ball cam 2 and the clutch device 1 can be operated with high accuracy.

During the origin learning control, for example, when the origin is stored in a state where a phase shift occurs between any one of the balls 3 and the drive cam groove 400 or the driven cam groove 500 (refer to FIG. 13), an erroneous origin is learned. In this state, the ball 3 is in contact with the drive cam groove 400 at only one point (first drive cam groove 401), and is in contact with the driven cam groove 500 at two points (first driven cam groove 501 and second driven cam groove 502) (see FIG. 13).

Figure 14:
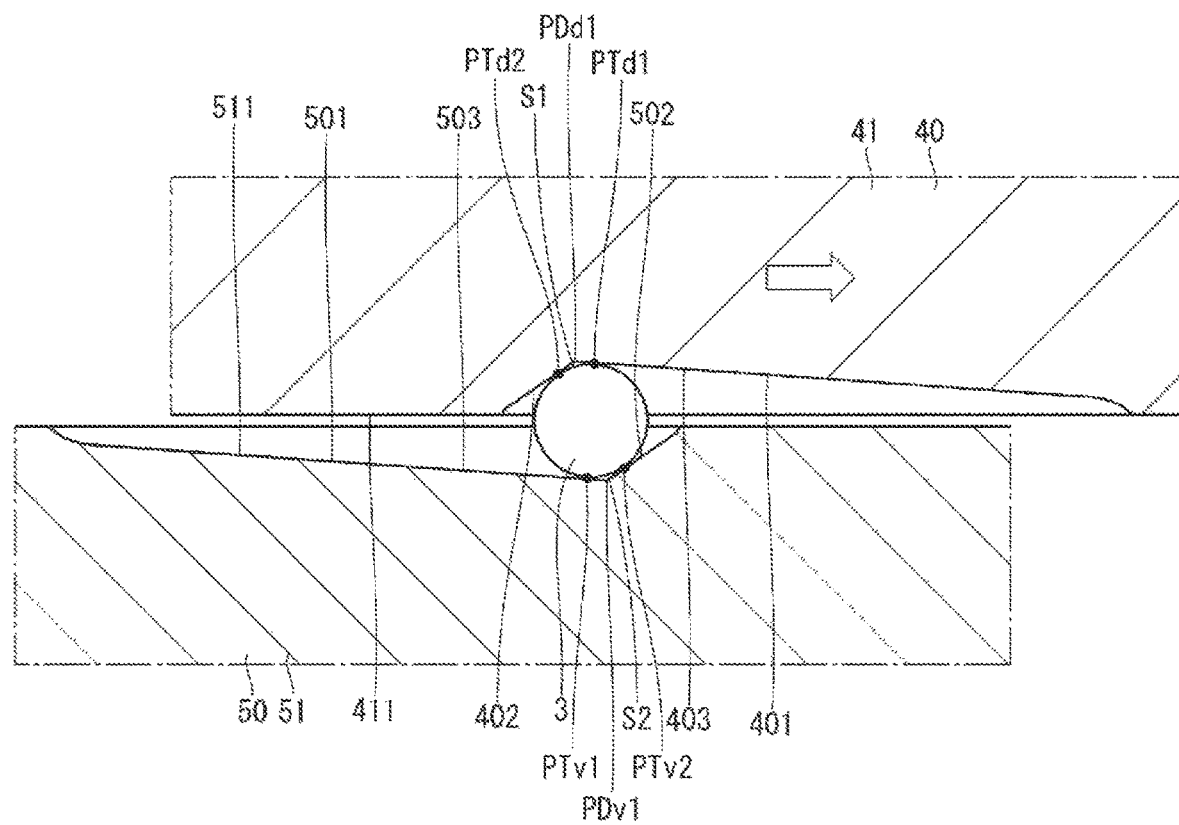
FIG. 14 is a cross-sectional view showing the drive cam groove and the driven cam groove of the clutch device according to the first embodiment, which is a diagram showing an origin position state.

Therefore, in the present embodiment, while the ball 3 and the drive cam groove 400 are in contact with each other at one point and the ball 3 and the driven cam groove 500 are in contact with each other at two points, the ECU 10 causes the ball 3 to slide in the first drive cam groove 401 to rotate the drive cam 40 to the one side in the circumferential direction of the drive cam main body 41, thereby forcibly setting an origin position state (see FIG. 14). In this state, that is, in the origin position state, the ball 3 is in contact with the drive cam groove 400 at two points (first drive cam groove 401 and second drive cam groove 402), and is in contact with the driven cam groove 500 at two points (first driven cam groove 501 and second driven cam groove 502) (see FIG. 14).

By storing the origin in a state where the origin position state is forcibly set as shown in FIG. 14, the origin can be accurately learned.

Next, settings of a drive torque applied to the drive cam 40 and the inclination angles of the second drive cam groove 402 and the second driven cam groove 502 during the origin learning will be described.

When the origin position state is forcibly set from the state where the phase shift occurs between the ball 3 and the drive cam groove 400 or the driven cam groove 500 (see FIG. 13) during the origin learning, if a torque, which is a torque of the drive cam 40, is excessively large, the ball 3 may pass through the origin and roll onto the second drive cam groove 402 and the second driven cam groove 502. When this phenomenon occurs, accurate origin learning cannot be performed. Therefore, in order to accurately perform the origin learning, it is necessary to limit the torque below a value at which the ball 3 does not roll onto the second drive cam groove 402 and the second driven cam groove 502.

Therefore, during the origin learning, when the torque of the drive cam 40 required for the ball 3 to roll onto the second drive cam groove 402 and the second driven cam groove 502 is defined as T2, and the torque of the drive cam 40 required when causing the ball 3 to slide in first drive cam groove 401 to rotate the drive cam 40 to the one side in the circumferential direction of the drive cam main body 41 in a state where the ball 3 and the drive cam groove 400 are in contact with each other at one point and the ball 3 and the driven cam groove 500 are in contact with each other at two points (see FIG. 13) is defined as T3, it is necessary to set the inclination angles β of the second drive cam groove 402 and the second driven cam groove 502 to satisfy T3<T2 in order to achieve accurate origin learning.

Figure 15:
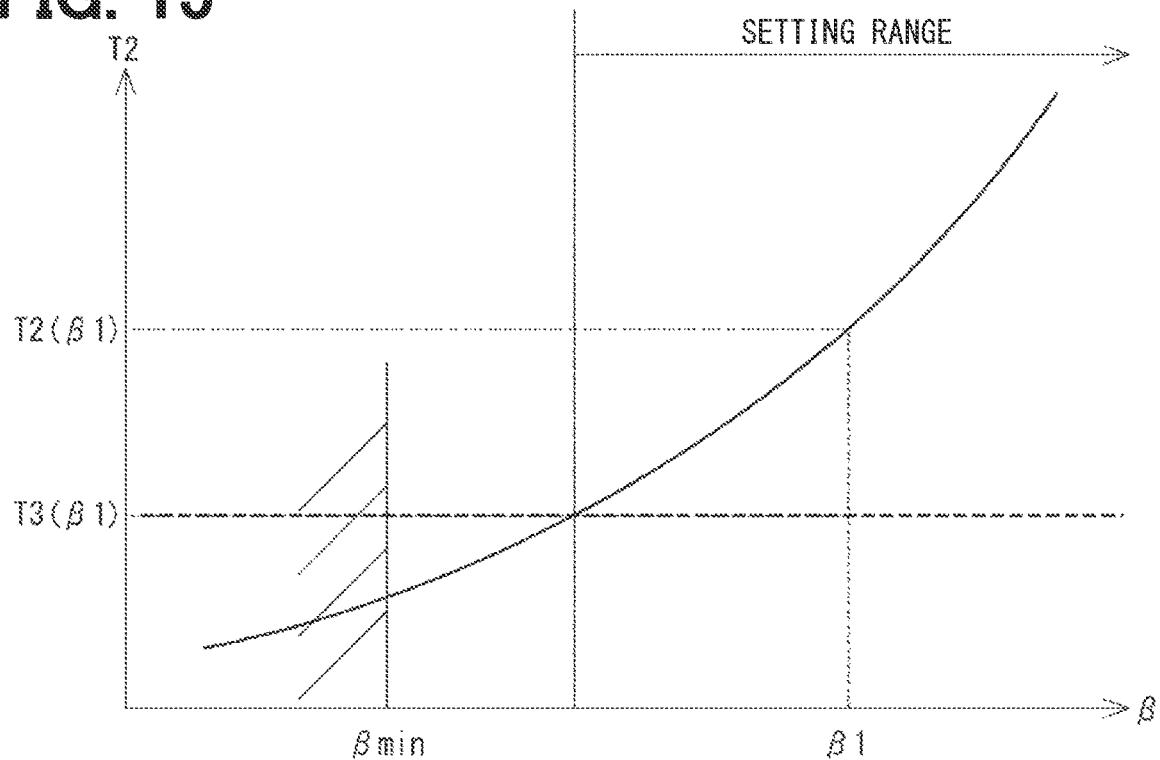
FIG. 15 is a diagram showing a relationship between a torque of the drive cam required for a rolling body to roll onto a second drive cam groove and inclination angles of the second drive cam groove and a second driven cam groove.

Here, T2 increases as the inclination angles β of the second drive cam groove 402 and the second driven cam groove 502 increase (see FIG. 15). In addition, T3 is constant regardless of a magnitude of the inclination angles β of the second drive cam groove 402 and the second driven cam groove 502 (see FIG. 16).

Figure 16:
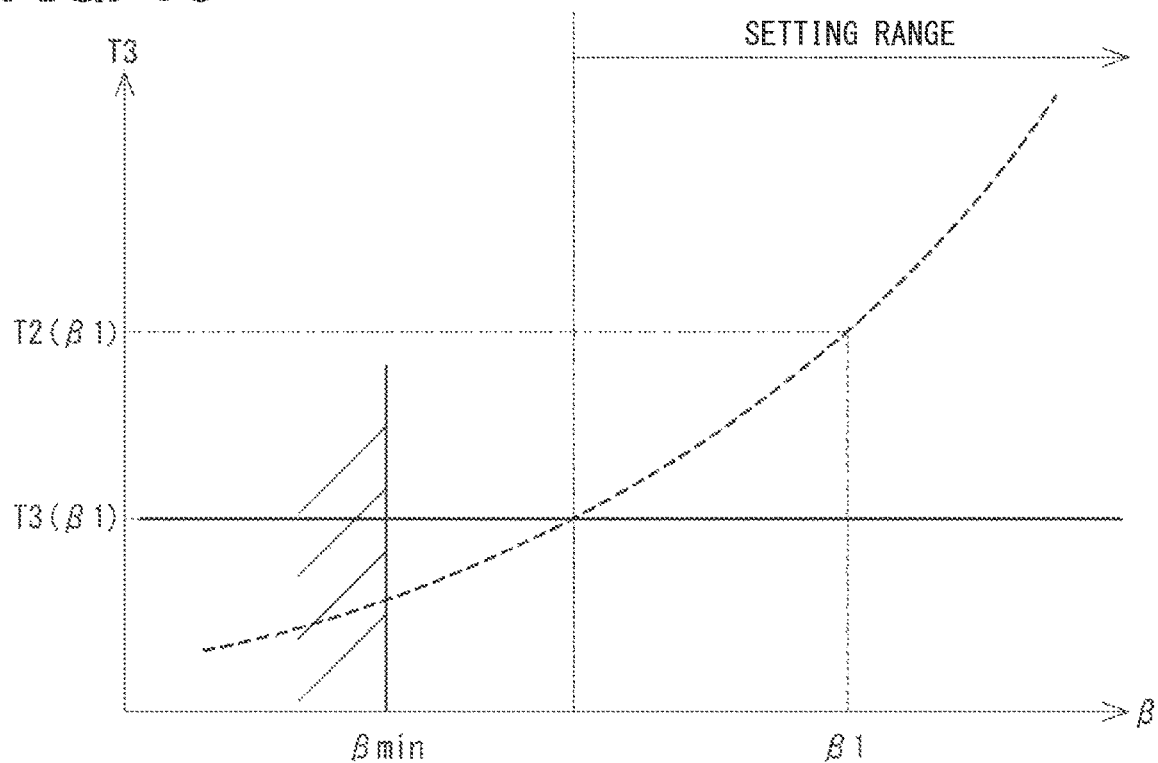
FIG. 16 is a diagram showing a relationship between a torque of the drive cam required for the rolling body to slide without rolling in a first drive cam groove and the inclination angles of the second drive cam groove and the second driven cam groove.

Specifically, as shown in FIGS. 15 and 16, it is necessary to set the inclination angles β of the second drive cam groove 402 and the second driven cam groove 502 such that T2(β1), which is T2 when the inclination angle β is β1 is larger than T3(β1), which is T3 when the inclination angle β is β1.

Figure 13:
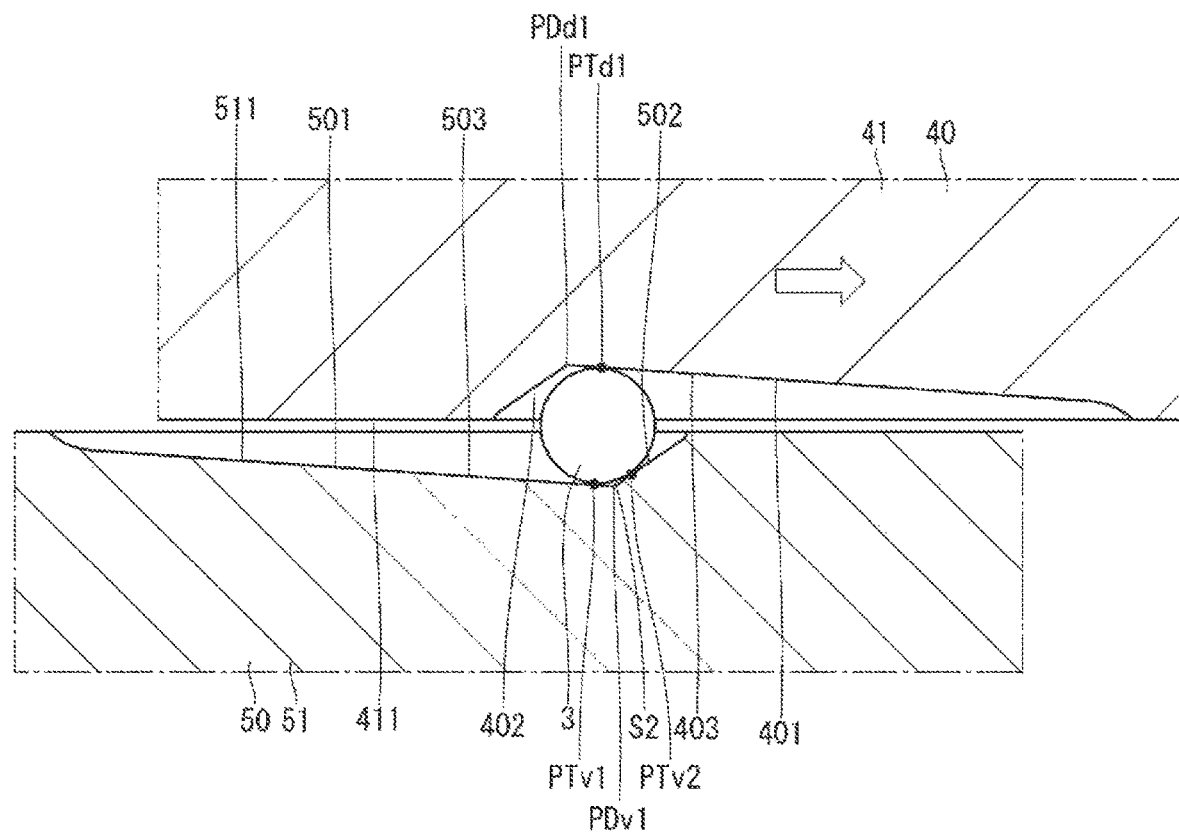
FIG. 13 is a cross-sectional view showing the drive cam groove and the driven cam groove of the clutch device according to the first embodiment, which is a diagram showing a state where a phase shift occurs.

In a case where the inclination angles β of the second drive cam groove 402 and the second driven cam groove 502 are relatively small, when the drive cam 40 is rotated to the one side in the circumferential direction of the drive cam main body 41 from the state shown in FIG. 13, the ball 3 may not slide and roll onto the second driven cam groove 502 of the driven cam 50 at the contact point between the first drive cam groove 401 of the drive cam 40 and the ball 3. When this phenomenon occurs, accurate origin learning cannot be performed.

Therefore, in order to avoid this phenomenon, it is necessary to set a limit (βmin) to a minimum value of the inclination angles β of the second drive cam groove 402 and the second driven cam groove 502. Therefore, in selection of β1, it is necessary to set β1 to be equal to or greater than βmin.

As described above, in the present embodiment, the inclination angles β of the second drive cam groove 402 and the second driven cam groove 502 are set to satisfy a relationship of T3<T2, and βmin≤β.

As described above, in the present embodiment, the first drive cam groove 401 extends from the drive cam specific position PSd1, which is a specific position in the circumferential direction of the drive cam main body 41, to the one side in the circumferential direction of the drive cam main body 41, and is formed with the groove bottom 403 inclined with respect to the one end surface 411 of the drive cam main body 41. The second drive cam groove 402 extends from the drive cam specific position PSd1 to the other side in the circumferential direction of the drive cam main body 41, and the inclination angle of the groove bottom 403 with respect to the one end surface 411 of the drive cam main body 41 is larger than the inclination angle of the groove bottom 403 of the first drive cam groove 401.

The first driven cam groove 501 extends from the driven cam specific position PSv1, which is a specific position in the circumferential direction of the driven cam main body 51, to the one side in the circumferential direction of the driven cam main body 51, and is formed with the groove bottom 503 inclined with respect to the one end surface 511 of the driven cam main body 51. The second driven cam groove 502 extends from the driven cam specific position Pv1 to the other side in the circumferential direction of the driven cam main body 51, and the inclination angle of the groove bottom 503 with respect to the one end surface 511 of the driven cam main body 51 is larger than the inclination angle of the groove bottom 503 of the first driven cam groove 501.

The ECU 10 controls the operation of the motor 20 such that the balls 3 roll in the first drive cam grooves 401 and the first driven cam grooves 501 during normal operation.

In the present embodiment, for example, during normal operation, when the ball 3 is in the first drive cam groove 401 and the first driven cam groove 501, and the driven cam 50 is at a position away from the initial position (origin) by a predetermined distance toward the clutch 70, if the energization to the motor 20 is blocked due to the power supply failure, the driven cam 50 restores to the initial position by the urging force from the clutch 70 side. At this time, the ball 3 rolls in the first drive cam groove 401 and the first driven cam groove 501, passes through the origin, and runs onto the second drive cam groove 402 and the second driven cam groove 502.

Here, the inclination angles of the second drive cam groove 402 and the second driven cam groove 502 are set to be larger than the inclination angles of the first drive cam groove 401 and the first driven cam groove 501. Therefore, the balls 3 that passes through the origin and runs onto the second drive cam groove 402 and the second driven cam groove 502 slows down, stops, rolls toward the origin, and restoration to the origin thereof is completed. As described above, in the present embodiment, the ball cam 2 can be quickly restored to the origin while effectively reducing an impact during restoration to the origin. Therefore, damage of the ball cam 2 during restoration to the origin can be reduced.

In the present embodiment, when the plane parallel to the one end surface 411 of the drive cam main body 41 and passing through the drive cam specific point PDd1, which is a point on the groove bottom 403 of the drive cam groove 400 at the drive cam specific position PSd1, is defined as the drive cam specific virtual plane PPd1, the distance Dd2 between the drive cam specific virtual plane PPd1 and the end portion of the groove bottom 403 of the second drive cam groove 402 on the side opposite to the drive cam specific point PDd1 is set to be equal to or less than the distance Dd1 between the drive cam specific virtual plane PPd1 and the end portion of the groove bottom 403 of the first drive cam groove 401 on the side opposite to the drive cam specific point PDd1 (see FIG. 9).

When a plane parallel to the one end surface 511 of the driven cam main body 51 and passing through a driven cam specific point PDv1, which is a point on the groove bottom 503 of the driven cam groove 500 at the driven cam specific position PSv1, is defined as a driven cam specific virtual plane PPv1, a distance between the driven cam specific virtual plane PPv1 and an end portion of the groove bottom 503 of the second driven cam groove 502 on a side opposite to the driven cam specific point PDv1 is set to be equal to or less than a distance between the driven cam specific virtual plane PPv1 and an end portion of the groove bottom 503 of the first driven cam groove 501 on a side opposite to the driven cam specific point PDv1 (see FIG. 9).

Therefore, when the ball cam 2 restores to the origin, a capacity that can sufficiently absorb the elastic energy stored in the clutch 70 and the return spring 55 can be set in the second drive cam groove 402 and the second driven cam groove 502.

In the present embodiment, when the ball 3 is in contact with the first drive cam groove 401 and the second drive cam groove 402 simultaneously, there are only two contact points, a first drive cam contact point PTd1, which is a contact point between the ball 3 and the first drive cam groove 401, and a second drive cam contact point PTd2, which is a contact point between the ball 3 and the second drive cam groove 402 (see FIG. 14). At this time, the ball 3 and the groove bottom 403 are not in contact with each other between the first drive cam contact point PTd1 and the second drive cam contact point PTd2, and a gap S1 is formed between the ball 3 and the groove bottom 403.

Regarding the above configuration, in other words, an end portion of the first drive cam groove 401 on a second drive cam groove 402 side and an end portion of the second drive cam groove 402 on a first drive cam groove 401 side are formed continuously without having a portion parallel to the one end surface 411 of the drive cam main body 41 in the groove bottom 403 therebetween.

When the ball 3 is in contact with the first driven cam groove 501 and the second driven cam groove 502 simultaneously, there are only two contact points, a first driven cam contact point PTv1, which is a contact point between the ball 3 and the first driven cam groove 501, and a second driven cam contact point PTv2, which is a contact point between the ball 3 and the second driven cam groove 502 (see FIGS. 13 and 14). At this time, the ball 3 and the groove bottom 503 are not in contact with each other between the first driven cam contact point PTv1 and the second driven cam contact point PTv2, and a gap S2 is formed between the ball 3 and the groove bottom 503.

Regarding the above configuration, in other words, an end portion of the first driven cam groove 501 on a second driven cam groove 502 side and an end portion of the second driven cam groove 502 on a first driven cam groove 501 side are formed continuously without having a portion parallel to the one end surface 511 of the driven cam main body 51 in the groove bottom 503 therebetween.

In a clutch device disclosed according to an example, a groove portion corresponding to an origin of a rolling body cam is formed in a planar shape perpendicular to an axis of the rolling body cam. Therefore, during the origin learning, a position of the rolling body tends to become unstable, and the origin learning may not be performed accurately.

On the other hand, in the present embodiment, the drive cam groove 400 is formed such that when the ball 3 is in contact with the first drive cam groove 401 and the second drive cam groove 402 simultaneously, the ball 3 and the drive cam grooves 400 are in contact with each other at two points. In addition, the driven cam groove 500 is formed such that when the ball 3 is in contact with the first driven cam groove 501 and the second driven cam groove 502 simultaneously, the ball 3 and the driven cam groove 500 are in contact with each other at two points.

Therefore, a position of the ball 3 during the origin learning is stabilized, and origin learning accuracy can be improved.

The present embodiment further includes the return spring 55 that can bias the driven cam 50 to the side opposite to the clutch 70 with respect to the housing 12.

With only the restoration of the driven cam 50 due to an elastic force of the clutch 70, the clutch gap (Sp1) due to the power supply failure may not be sufficiently ensured. In the present embodiment, the clutch gap can be sufficiently ensured by the return spring 55, and a drag torque of the clutch 70 at the time of the power supply failure can be effectively reduced.

In the present embodiment, when the torque of the drive cam 40 required for the ball 3 to roll onto the second drive cam groove 402 is defined as T2, and the torque of the drive cam 40 required for the ball 3 to slide in first drive cam groove 401 without rolling in a state where the ball 3 is in contact with the first driven cam groove 501 and the second driven cam groove 502 simultaneously and the ball 3 is in contact with only the first drive cam groove 401 of the first drive cam groove 401 and the second drive cam groove 402 is defined as T3, the second drive cam groove 402 is set such that the inclination angle of the groove bottom 403 with respect to the one end surface 411 of the drive cam main body 41 satisfies the relationship of T3<T2.

In the present embodiment, when the torque of the drive cam 40 required for the ball 3 to roll onto the second driven cam groove 502 is defined as T2, and the torque of the drive cam 40 required for the ball 3 to slide in first driven cam groove 501 without rolling in a state where the ball 3 is in contact with the first driven cam groove 401 and the second drive cam groove 402 simultaneously and the ball 3 is in contact with only the first driven cam groove 501 of the first driven cam groove 501 and the second driven cam groove 502 is defined as T3, the second driven cam groove 502 is set such that the inclination angle of the groove bottom 503 with respect to the one end surface 511 of the driven cam main body 51 satisfies the relationship of T3<T2.

Therefore, the origin learning can be appropriately performed. Specifically, by setting the torque of the motor 20 as described above and setting a margin between T2 and T3, an origin position state can be accurately created in which the ball 3 does not run onto the second drive cam groove 402 and the second driven cam groove 502, and the ball 3 is in four-point contact with the first drive cam groove 401, the second drive cam groove 402, the first driven cam groove 501, and the second driven cam groove 502. Therefore, the origin learning can be performed with high accuracy.

Second Embodiment

Figure 17:
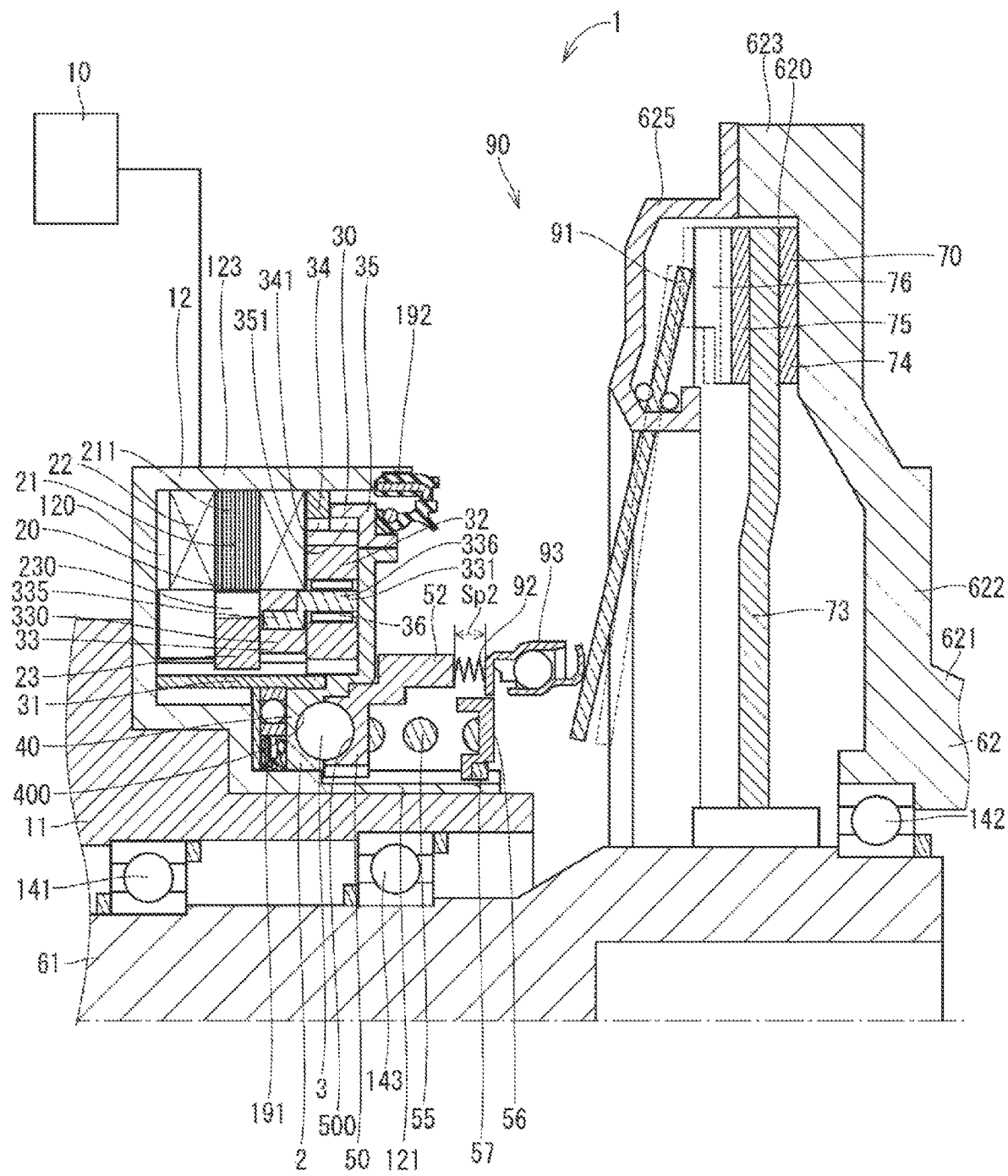
FIG. 17 is a cross-sectional view showing a part of a clutch device according to a second embodiment.

FIG. 17 shows a clutch device according to a second embodiment. The second embodiment is different from the first embodiment in configurations of a clutch and a state changing unit, and the like.

In the present embodiment, ball bearings 141 and 143 are provided between the inner peripheral wall of the fixed body 11 and the outer peripheral wall of the input shaft 61. Accordingly, the input shaft 61 is bearing-supported by the fixed body 11 via the ball bearings 141 and 143.

The housing 12 is fixed to the fixed body 11 such that a part of an outer wall is in contact with a wall surface of the fixed body 11. For example, the housing 12 is fixed to the fixed body 11 such that a surface of the housing small plate portion 124 on a side opposite to the ball 3, the inner peripheral wall of the housing inner cylinder portion 121, and an inner peripheral wall of the housing small inner cylinder portion 126 is in contact with an outer wall of the fixed body 11. The housing 12 is fixed to the fixed body 11 by bolts (not shown) or the like. Here, the housing 12 is provided coaxially with the fixed body 11 and the input shaft 61.

An arrangement of the motor 20, the speed reducer 30, the ball cam 2, and the like with respect to the housing 12 is the same as that of the first embodiment.

In the present embodiment, the output shaft 62 includes the shaft portion 621, the plate portion 622, the cylinder portion 623, and a cover 625. The shaft portion 621 is formed in a substantially cylindrical shape. The plate portion 622 is formed integrally with the shaft portion 621 to extend in an annular plate shape from one end of the shaft portion 621 to the radially outer side. The cylinder portion 623 is formed integrally with the plate portion 622 to extend in a substantially cylindrical shape from an outer edge portion of the plate portion 622 to a side opposite to the shaft portion 621. The output shaft 62 is bearing-supported by the input shaft 61 via the ball bearing 142. The clutch space 620 is formed in the inside of the cylinder portion 623.

The clutch 70 is provided between the input shaft 61 and the output shaft 62 in the clutch space 620. The clutch 70 includes a support portion 73, a friction plate 74, a friction plate 75, and a pressure plate 76. The support portion 73 is formed in a substantially annular plate shape to extend from an outer peripheral wall of an end portion of the input shaft 61 to the radially outer side on a driven cam 50 side with respect to the plate portion 622 of the output shaft 62.

The friction plate 74 is formed in a substantially annular plate shape, and is provided on a plate portion 622 side of the output shaft 62 on an outer edge portion of the support portion 73. The friction plate 74 is fixed to the support portion 73. The friction plate 74 can come into contact with the plate portion 622 by deforming the outer edge portion of the support portion 73 toward the plate portion 622.

The friction plate 75 is formed in a substantially annular plate shape, and is provided on a side opposite to the plate portion 622 of the output shaft 62 on the outer edge portion of the support portion 73. The friction plate 75 is fixed to the support portion 73.

The pressure plate 76 is formed in a substantially annular plate shape, and is provided on the driven cam 50 side with respect to the friction plate 75.

In an engaged state in which the friction plate 74 and the plate portion 622 come into contact with each other, that is, are engaged with each other, a frictional force is generated between the friction plate 74 and the plate portion 622, and relative rotation between the friction plate 74 and the plate portion 622 is restricted according to a magnitude of the frictional force. On the other hand, in a non-engaged state in which the friction plate 74 and the plate portion 622 are separated from each other, that is, are not engaged with each other, no frictional force is generated between the friction plate 74 and the plate portion 622, and the relative rotation between the friction plate 74 and the plate portion 622 is not restricted.

When the clutch 70 is in the engaged state, the torque input to the input shaft 61 is transmitted to the output shaft 62 via the clutch 70. On the other hand, when the clutch 70 is in the non-engaged state, the torque input to the input shaft 61 is not transmitted to the output shaft 62.

The cover 625 is formed in a substantially annular shape, and is provided on the cylinder portion 623 of the output shaft 62 to cover the pressure plate 76 from a side opposite to the friction plate 75.

In the present embodiment, the clutch device 1 includes a state changing unit 90 instead of the state changing unit 80 shown in the first embodiment. The state changing unit 90 includes a diaphragm spring 91 as an "elastic deformation portion", a return spring 92, a release bearing 93, and the like.

The diaphragm spring 91 is formed in a substantially annular disk spring shape, and is provided on the cover 625 such that one end in an axial direction, that is, an outer edge portion is in contact with the pressure plate 76. Here, the diaphragm spring 91 is formed such that the outer edge portion is located on a clutch 70 side with respect to an inner edge portion, and a portion between the inner edge portion and the outer edge portion is supported by the cover 625. The diaphragm spring 91 is elastically deformable in the axial direction. Accordingly, the diaphragm spring 91 urges the pressure plate 76 toward the friction plate 75 by the one end in the axial direction, that is, the outer edge portion. Accordingly, the pressure plate 76 is pressed against the friction plate 75, and the friction plate 74 is pressed against the plate portion 622. That is, the clutch 70 is normally in the engaged state.

In the present embodiment, the clutch device 1 is a so-called normally closed-type clutch device that is normally in the engaged state.

The return spring 92 is, for example, a coil spring, and is provided such that one end is in contact with an end surface of the driven cam cylinder portion 52 on the clutch 70 side.

The release bearing 93 is provided between the other end of the return spring 92 and the inner edge portion of the diaphragm spring 91. The return spring 92 urges the release bearing 93 toward the diaphragm spring 91. The release bearing 93 bearing-supports the diaphragm spring 91 while receiving a load in a thrust direction from the diaphragm spring 91. An urging force of the return spring 92 is smaller than an urging force of the diaphragm spring 91.

As shown in FIG. 17, when the ball 3 is located at a position (origin) corresponding to a deepest portion of the drive cam groove 400 and the driven cam groove 500, a distance between the drive cam 40 and the driven cam 50 is relatively small, and a gap Sp2 is formed between the release bearing 93 and an end surface of the driven cam cylinder portion 52 of the driven cam 50. Therefore, the friction plate 74 is pressed against the plate portion 622 by the urging force of the diaphragm spring 91, the clutch 70 is in the engaged state, and torque transmission between the input shaft 61 and the output shaft 62 is permitted.

Here, when the electric power is supplied to the coil 22 of the motor 20 under the control of the ECU 10, the motor 20 rotates, the torque is output from the speed reducer 30, and the drive cam 40 rotates relative to the housing 12. Accordingly, the ball 3 rolls from the position corresponding to the deepest portion to one side in the circumferential direction of the drive cam groove 400 and the driven cam groove 500. Accordingly, the driven cam 50 moves relative to the housing 12 and the drive cam 40 in the axial direction, that is, moves toward the clutch 70. Accordingly, the gap Sp2 between the release bearing 93 and the end surface of the driven cam cylinder portion 52 is reduced, and the return spring 92 is compressed in the axial direction between the driven cam 50 and the release bearing 93.

When the driven cam 50 further moves toward the clutch 70, the return spring 92 is maximally compressed, and the release bearing 93 is pressed toward the clutch 70 by the driven cam 50. Accordingly, the release bearing 93 moves toward the clutch 70 against a reaction force from the diaphragm spring 91 while pressing the inner edge portion of the diaphragm spring 91.

When the release bearing 93 moves toward the clutch 70 while pressing the inner edge portion of the diaphragm spring 91, the inner edge portion of the diaphragm spring 91 moves toward the clutch 70, and the outer edge portion of the diaphragm spring 91 moves toward a side opposite to the clutch 70. Accordingly, the friction plate 74 is separated from the plate portion 622, and a state of the clutch 70 is changed from the engaged state to the non-engaged state. As a result, the torque transmission between the input shaft 61 and the output shaft 62 is blocked.

When a clutch transmission torque is 0, the ECU 10 stops the rotation of the motor 20. Accordingly, the state of the clutch 70 is maintained in the non-engaged state. In this way, the diaphragm spring 91 of the state changing unit 90 can receive a force in the axial direction from the driven cam 50 and change the state of the clutch 70 to the engaged state or the non-engaged state according to a relative position of the driven cam 50 in the axial direction with respect to the housing 12.

In the present embodiment, similarly to the first embodiment, the ball cam 2 can be quickly restored to the origin while effectively reducing an impact during restoration to the origin. Therefore, damage of the ball cam 2 during restoration to the origin can be reduced.

In the present embodiment, the inner sealing member 191 and the outer sealing member 192 as "seal members" also can maintain the accommodation space 120 and the clutch space 620 in an airtight or liquid-tight manner.

In the present embodiment, the clutch device 1 does not include the oil supply portion 5 shown in the first embodiment. That is, in the present embodiment, the clutch 70 is a dry clutch.

In this way, the present disclosure is also applicable to a normally closed-type clutch device including a dry clutch.

Other Embodiments

In the above embodiments, an example is shown in which the groove bottom 403 of the first drive cam groove 401 and the groove bottom 403 of the second drive cam groove 402 have constant inclination angles with respect to the one end surface 411. In addition, an example is shown in which the groove bottom 503 of the first driven cam groove 501 and the groove bottom 503 of the second driven cam groove 502 have constant inclination angles with respect to the one end surface 511. On the other hand, in other embodiments, as long as the inclination angle of the groove bottom 403 of the second drive cam groove 402 is larger than the inclination angle of the groove bottom 403 of the first drive cam groove 401, the inclination angles of the groove bottom 403 of the first drive cam groove 401 and the groove bottom 403 of the second drive cam groove 402 with respect to the one end surface 411 may not be constant. In addition, as long as the inclination angle of the groove bottom 503 of the second driven cam groove 502 is larger than the inclination angle of the groove bottom 503 of the first driven cam groove 501, the inclination angles of the groove bottom 503 of the first driven cam groove 501 and the groove bottom 503 of the second driven cam groove 502 with respect to the one end surface 511 may not be constant.

In other embodiments, the return spring 55 as an "urging member" may not be provided.

In other embodiments, the elastic deformation portion of the state changing unit may be, for example, a coil spring or rubber as long as the elastic deformation portion is elastically deformable in the axial direction. In addition, in other embodiments, the state changing unit may include only a rigid body without including the elastic deformation portion.

In other embodiments, the number of drive cam grooves 400 and the number of driven cam grooves 500 may be any number as long as the number of drive cam grooves 400 and the number of driven cam grooves 500 are three or more. In addition, the number of balls 3 may be adjusted according to the number of drive cam grooves 400 and driven cam grooves 500.

The present disclosure can be applied not only to the vehicle that travels by the drive torque from the internal combustion engine, but also to an electric vehicle, a hybrid vehicle, or the like that can travel by a drive torque from a motor.

In other embodiments, the torque may be input from the second transmission portion, and output from the first transmission portion via the clutch. In addition, for example, when one of the first transmission portion and the second transmission portion is non-rotatably fixed, the rotation of the other of the first transmission portion and the second transmission portion can be stopped by making the clutch to the engaged state. In this case, the clutch device can be used as a brake device.

As described above, the present disclosure is not limited to the above embodiments, and can be implemented in various forms within a scope not departing from the concept of the present disclosure.

The control unit of the clutch device and the method thereof described in the present disclosure may be implemented by a dedicated computer that is provided by configuring a processor and a memory programmed to execute one or more functions embodied by a computer program. Alternatively, the control unit of the clutch device and the method thereof described in the present disclosure may be implemented by a dedicated computer provided by configuring a processor with one or more dedicated hardware logic circuits. Alternatively, the control unit of the clutch device and the method thereof described in the present disclosure may be implemented by one or more dedicated computers configured by a combination of a processor and a memory programmed to execute one or multiple functions and a processor configured by one or more hardware logic circuits.

In addition, the computer program may be stored in a computer-readable non-transitional tangible recording medium as an instruction executed by a computer.

The present disclosure has been described based on the embodiments. However, the present disclosure is not limited to the embodiments and the structures. The present disclosure also includes various modification examples and modifications within the scope of equivalents. In addition, various combinations and forms, and further, other combinations and forms which include only one element, more elements, or less elements are included in the scope and the spirit of the present disclosure.

What is claimed is:

1. A clutch device comprising:
   a housing;
   a prime mover provided in the housing and configured to operate by energization and output a torque;
   a speed reducer configured to decelerate the speed and output the torque of the prime mover;
   a rolling body cam including a drive cam that includes a drive cam main body and a plurality of drive cam grooves formed in one end surface of the drive cam main body and configured to rotate relative to the housing when the torque output from the speed reducer is input, a driven cam that includes a driven cam main body and a plurality of driven cam grooves formed in one end surface of the driven cam main body and configured to move relative to the housing in an axial direction when the drive cam rotates relative to the housing, and a rolling body provided to roll between the drive cam grooves and the driven cam grooves;
   a clutch provided between a first transmission portion and a second transmission portion that are provided rotatably relative to the housing, the clutch configured to permit torque transmission between the first transmission portion and the second transmission portion when in an engaged state and to block the torque transmission between the first transmission portion and the second transmission portion when in a non-engaged state;
   a state changing unit configured to receive a force in the axial direction from the driven cam and change a state of the clutch to the engaged state or the non-engaged state according to a relative position of the driven cam in the axial direction with respect to the housing; and
   a control unit configured to control the energization to the prime mover and control an operation of the prime mover, wherein
   the drive cam groove includes:
      a first drive cam groove that extends from a drive cam specific position, which is a specific position in a circumferential direction of the drive cam main body, to one side in the circumferential direction of the drive cam main body, and is formed with a groove bottom inclined with respect to the one end surface of the drive cam main body such that a depth becomes shallower at a constant rate from the drive cam specific position toward the one side in the circumferential direction of the drive cam main body; and
      a second drive cam groove that extends from the drive cam specific position to an other side in the circumferential direction of the drive cam main body, is provided with a groove bottom inclined with respect to the one end surface of the drive cam main body such that a depth becomes shallower at a constant rate from the drive cam specific position toward the other side in the circumferential direction of the drive cam main body, and in which an inclination angle of the groove bottom with respect to the one end surface of the drive cam main body is larger than an inclination angle of the groove bottom of the first drive cam groove,
   the driven cam groove includes:
      a first driven cam groove that extends from a driven cam specific position, which is a specific position in a circumferential direction of the driven cam main body, to one side in the circumferential direction of the driven cam main body, and is formed with a groove bottom inclined with respect to the one end surface of the driven cam main body such that a depth becomes shallower at a constant rate from the driven cam specific position toward the one side in the circumferential direction of the driven cam main body; and
      a second driven cam groove that extends from the driven cam specific position to an other side in the circumferential direction of the driven cam main body, is provided with a groove bottom inclined with respect to the one end surface of the driven cam main body such that a depth becomes shallower at a constant rate from the driven cam specific position toward the other side in the circumferential direction of the driven cam main body, and in which an inclination angle of the groove bottom of the second driven cam groove with respect to the one end surface of the driven cam main body is larger than an inclination angle of the groove bottom of the first driven cam groove, and
   the control unit is configured to control the operation of the prime mover such that the rolling body rolls in the first drive cam groove and the first driven cam groove during normal operation,
   a plane parallel to the one end surface of the drive cam main body and passing through a driven cam specific point, which is a point on the groove bottom of the drive cam groove at the drive cam specific position, is a drive cam specific virtual plane,
   a distance between the drive cam specific virtual plane and a second end portion of the groove bottom of the second drive cam groove on a side opposite to the drive cam specific point is set to be less than a distance between the drive cam specific virtual plane and a first end portion of the groove bottom of the first drive cam groove on a side opposite to the drive cam specific point, and wherein the second end portion of the groove bottom of the second drive cam groove is a second end limit to which the rolling body is configured to roll on the second drive cam groove and the first end portion of the groove bottom of the first drive cam groove is a first end limit to which the rolling body is configured to roll on the first drive cam groove such that the rolling body protrudes less from the drive cam specific virtual plane in the second end portion of the groove bottom of the second drive cam groove than in the first end portion of the groove bottom of the first drive cam groove, and
   a plane parallel to the one end surface of the driven cam main body and passing through a driven cam specific point, which is a point on the groove bottom of the driven cam groove at the driven cam specific position, is a driven cam specific virtual plane,
   a distance between the driven cam specific virtual plane and a second end portion of the groove bottom of the second driven cam groove on a side opposite to the driven cam specific point is set to be less than a distance between the driven cam specific virtual plane and a first end portion of the groove bottom of the first driven cam groove on a side opposite to the driven cam specific point, and wherein the second end portion of the groove bottom of the second driven cam groove is a second end limit to which the rolling body is configured to roll on the second driven cam groove and the first end portion of the groove bottom of the first driven cam groove is a first end limit to which the rolling body is configured to roll on the first driven cam groove such that the rolling body protrudes less from the driven cam specific virtual plane in the second end portion of the groove bottom of the second driven cam groove than in the first end portion of the groove bottom of the first driven cam groove.

2. The clutch device according to claim 1, wherein when the rolling body is in contact with the first drive cam groove and the second drive cam groove simultaneously, there are only two contact points including a first drive cam contact point, which is a contact point between the rolling body and the first drive cam groove, and a second drive cam contact point, which is a contact point between the rolling body and the second drive cam groove, and when the rolling body is in contact with the first driven cam groove and the second driven cam groove simultaneously, there are only two contact points including a first driven cam contact point, which is a contact point between the rolling body and the first driven cam groove, and a second driven cam contact point, which is a contact point between the rolling body and the second driven cam groove.

3. The clutch device according to claim 1, further comprising:
an urging member configured to urge the driven cam to a side opposite to the clutch with respect to the housing.

4. The clutch device according to claim 1, wherein
a torque of the drive cam required for the rolling body to roll onto the second drive cam groove is T2,
a torque of the drive cam required for the rolling body to slide in the first drive cam groove without rolling in a state where the rolling body is in contact with the first driven cam groove and the second driven cam groove simultaneously and where the rolling body is in contact with only the first drive cam groove among the first drive cam groove and the second drive cam groove is T3, and
the second drive cam groove is set such that the inclination angle of the groove bottom with respect to the one end surface of the drive cam main body satisfies a relationship of T3<T2.

5. The clutch device according to claim 1, wherein
a torque of the drive cam required for the rolling body to roll onto the second driven cam groove is T2,
a torque of the drive cam required for the rolling body to slide in the first driven cam groove without rolling in a state where the rolling body is in contact with the first drive cam groove and the second drive cam groove simultaneously and where the rolling body is in contact with only the first driven cam groove among the first driven cam groove and the second driven cam groove is T3, and
the second driven cam groove is set such that the inclination angle of the groove bottom with respect to the one end surface of the driven cam main body satisfies a relationship of T3<T2.

* * * * *